United States Patent
Osborne et al.

(10) Patent No.: US 12,313,524 B2
(45) Date of Patent: May 27, 2025

(54) SYSTEMS FOR DETECTING LIGHT BY SPECTRAL DISCRIMINATION AND METHODS FOR USING SAME

(71) Applicant: Becton, Dickinson and Company, Franklin Lakes, NJ (US)

(72) Inventors: Geoffrey Osborne, Los Gatos, CA (US); Ihor V. Berezhnyy, Los Gatos, CA (US)

(73) Assignee: BECTON, DICKINSON AND COMPANY, Franklin Lakes, NJ (US)

(*) Notice: Subject to any disclaimer, the term of this patent is extended or adjusted under 35 U.S.C. 154(b) by 285 days.

(21) Appl. No.: 17/723,872

(22) Filed: Apr. 19, 2022

(65) Prior Publication Data
US 2022/0364987 A1    Nov. 17, 2022

Related U.S. Application Data

(60) Provisional application No. 63/188,617, filed on May 14, 2021.

(51) Int. Cl.
*G01N 15/14* (2024.01)
*G01N 15/0205* (2024.01)
(Continued)

(52) U.S. Cl.
CPC ..... *G01N 15/1459* (2013.01); *G01N 15/0205* (2013.01); *G01N 21/53* (2013.01);
(Continued)

(58) Field of Classification Search
CPC ........... G01N 15/1459; G01N 15/0205; G01N 21/53; G01N 21/645; G01N 2021/6471;
(Continued)

(56) References Cited

U.S. PATENT DOCUMENTS

| 8,467,055 B2 | 6/2013 | Imanishi et al. |
| 2007/0146888 A1* | 6/2007 | Schmidt ............... G01J 3/0218 |
| | | 359/589 |

(Continued)

FOREIGN PATENT DOCUMENTS

| EP | 2960644 A1 | 12/2015 |
| WO | WO2017048844 A1 | 3/2017 |
| WO | WO2019226897 A2 | 11/2019 |

*Primary Examiner* — Tarifur R Chowdhury
*Assistant Examiner* — Akbar H. Rizvi
(74) *Attorney, Agent, or Firm* — Khin K. Chin; Bret E. Field; BOZICEVIC, FIELD & FRANCIS LLP

(57) ABSTRACT

Aspects of the present disclosure include systems for detecting light from a particle in a flow stream by spectral discrimination. Systems according to certain embodiments include a light source configured to irradiate a particle propagating along a flow stream through an interrogation region, a light detection system that includes a wavelength separator component configured to pass light having a predetermined spectral range across the wavelength separator, a light adjustment component configured to continuously convey light from the irradiated particle across the wavelength separator as the particle is propagated along the flow stream through the interrogation region and a photodetector configured to detect light conveyed across the wavelength separator. Systems also include a processor for generating a photodetector signal pulse in response to light detected from the wavelength separator. Methods and kits for detecting light with the subject systems are also described.

20 Claims, 10 Drawing Sheets

(51) Int. Cl.
*G01N 21/53* (2006.01)
*G01N 21/64* (2006.01)

(52) U.S. Cl.
CPC ... *G01N 21/645* (2013.01); *G01N 2021/6471* (2013.01); *G01N 2021/6478* (2013.01)

(58) Field of Classification Search
CPC ......... G01N 2021/6478; G01N 15/149; G01N 2015/1006; G01N 15/1434; G01N 21/255; G01N 2015/1493; G01N 2015/1497
See application file for complete search history.

(56) References Cited

U.S. PATENT DOCUMENTS

| | | | |
|---|---|---|---|
| 2007/0236682 A9 | 10/2007 | Fritz et al. | |
| 2011/0222051 A1 | 9/2011 | Heng | |
| 2013/0037726 A1* | 2/2013 | Kiesel | G01N 21/6428 250/458.1 |
| 2013/0334407 A1* | 12/2013 | Perrault, Jr. | G01N 15/1484 250/575 |
| 2017/0038258 A1* | 2/2017 | Hegyi | G01J 3/2823 |
| 2017/0038259 A1 | 2/2017 | Siegal et al. | |
| 2017/0218425 A1* | 8/2017 | Chen | A61B 5/150412 |
| 2018/0246029 A1 | 8/2018 | Wu et al. | |
| 2019/0383746 A1* | 12/2019 | Vacca | G01N 21/65 |
| 2020/0292454 A1* | 9/2020 | Li | G01N 21/645 |

\* cited by examiner

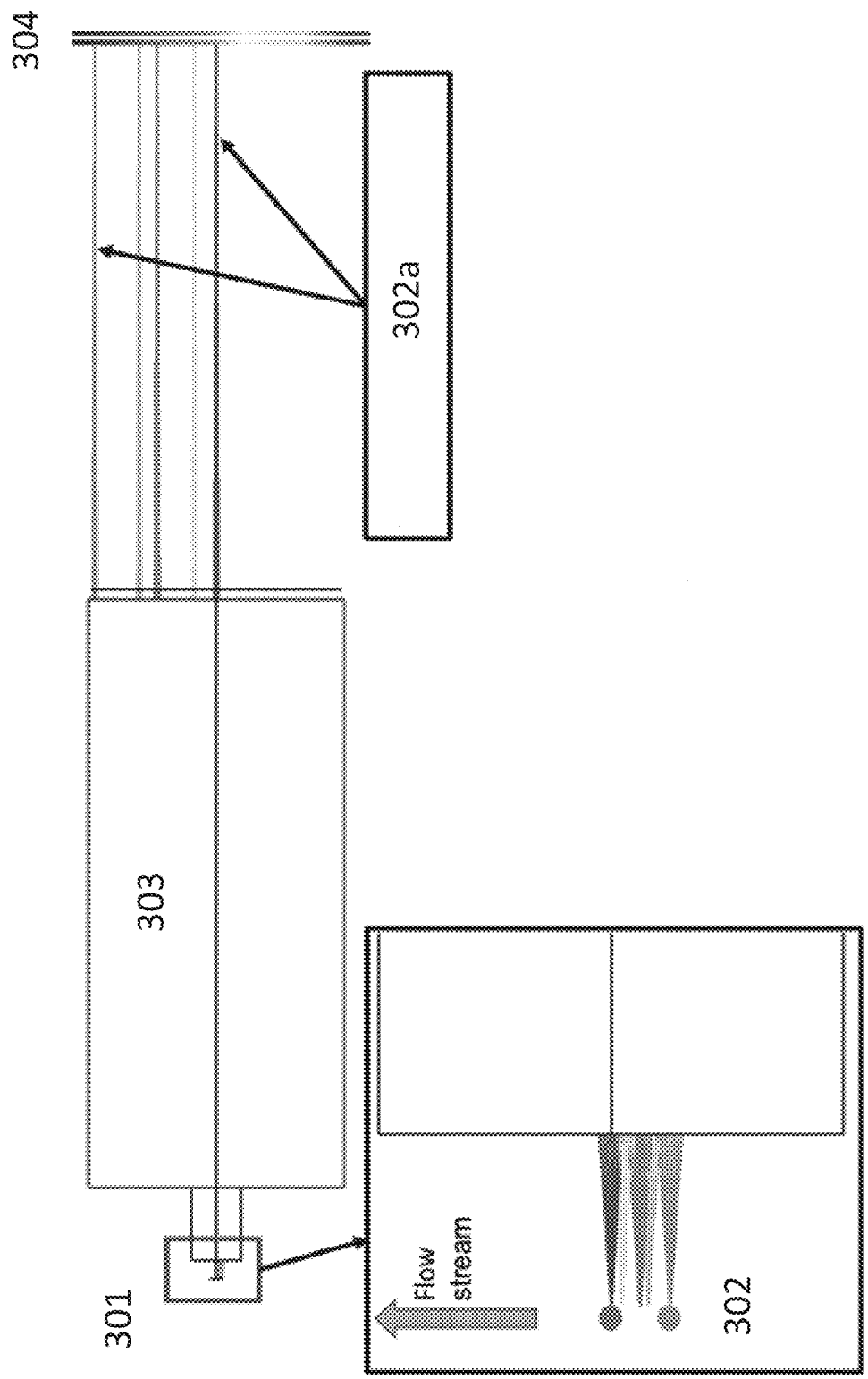

SYSTEMS FOR DETECTING LIGHT BY SPECTRAL DISCRIMINATION AND METHODS FOR USING SAME

CROSS-REFERENCE TO RELATED APPLICATIONS

Pursuant to 35 U.S.C. § 119 (e), this application claims priority to the filing date of U.S. Provisional Patent Application Ser. No. 63/188,617 filed May 14, 2021; the disclosure of which application is incorporated herein by reference in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector. The amount of light that reaches the detector can impact the overall quality of the optical signal outputted by the detector. The amount of light that reaches the detector can be raised by increasing the surface area of the detector or by increasing collection of the light from the sample.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include systems for detecting light from a particle in a flow stream by spectral discrimination. Systems according to certain embodiments include a light source configured to irradiate a particle propagating along a flow stream through an interrogation region, a light detection system that includes a wavelength separator component configured to pass light having a predetermined spectral range across the wavelength separator, a light adjustment component configured to continuously convey light from the irradiated particle across the wavelength separator as the particle is propagated along the flow stream through the interrogation region and a photodetector configured to detect light conveyed across the wavelength separator.

In some embodiments, the light adjustment component that is configured to continuously convey light from the particle as it is propagated along the flow stream through the interrogation region includes a double telecentric lens. In some instances, the light adjustment component is configured to convey collimated and perpendicularly incident light from the irradiated particle to the wavelength separator. In some embodiments, the light source continuously irradiates the particle propagating along the flow stream across an interrogation region of the flow stream of 1 µm or more, such as 10 µm or more, such as for example across an interrogation region of 1 mm or more. In certain instances, the interrogation region of the flow stream where the propagating particle is irradiated ranges from 0.001 mm to 10 mm. In some instances, light collected from the particle propagating along the flow stream is fluorescence. In some instances, light collected from the particle propagating along the flow stream is scattered light.

In some embodiments, the wavelength separator is configured to pass light having different spectral ranges, such as spectral ranges from 1 nm to 25 nm. In certain instances, the wavelength separator is configured to pass light having a spectral range of 10 nm. In some instances, the wavelength separator passes light having wavelengths that range from 200 nm to 1200 nm, such as from 360 nm to 960 nm. In some embodiments, the wavelength separator includes a linear variable optical filter. In some instances, the wavelength separator includes one or more linear variable bandpass filters. For example, the wavelength separator may include a long pass linear variable bandpass filter, a short pass linear variable bandpass filter or a combination of a long pass linear variable bandpass filter and a short pass linear variable bandpass filter. In other embodiments, the wavelength separator includes one or more linear variable edge filters. For example, the wavelength separator may include a long pass linear variable edge filter, a short pass linear variable edge filter or a combination of a long pass linear variable edge filter and a short pass linear variable edge filter.

In embodiments, systems further include a processor configured to generate a photodetector signal pulse in response to light detected from the wavelength separator. In some embodiments, systems include memory operably coupled to the processor where the memory includes instructions stored thereon, which when executed by the processor, cause the processor to irradiate with a light source a particle propagating along a flow stream through an interrogation region where the light adjustment component is configured to continuously convey light from the particle across the wavelength separator component as the particle propagates along the flow stream through the interrogation region and generate photodetector signals in response to light detected from the wavelength separator. In some embodiments, a photodetector signal pulse is generated from the photodetector signals. In some instances, the photodetector signal pulse includes data signals collected across a predetermined spectral range of light. In certain instances, the photodetector signal pulse includes data signals collected across a spectrum having wavelengths that range from 200 nm to 1200 nm, such as from 360 nm to 960 nm. In some embodiments, each photodetector signal pulse has a unique shape or pattern. In certain embodiments, each photodetector signal pulse has an identifiable shape or pattern, such as where the photodetector signal pulse can be used to identify the components of the particle (e.g., fluorophores) or parameters of the particle (e.g., particle shape, size). In some embodiments, the memory includes instructions stored thereon which when executed by the processor, cause the processor to identify the particle in the flow stream based on the photodetector signal pulse. In some embodiments, the memory includes instructions for generating a sort decision for the particle based on the photodetector signal pulse. In other embodiments, systems include a particle sorter for sorting the particle based on the photodetector signal pulse. In certain embodiments, the system is or is a part of a flow cytometer. In certain embodiments, the particle analyzer is configured to generate a spectrum of the light from the irradiated particle in the absence of a spectral processing module.

Aspects of the disclosure also include methods for detecting light from a particle in a flow stream by spectral discrimination. Methods according to certain embodiments include irradiating with a light source a particle propagating along a flow stream through an interrogation region, detecting light from the particle in the flow stream with a light detection system having a wavelength separator component configured to pass light having a predetermined spectral range across the wavelength separator, a light adjustment component configured to continuously convey light from the irradiated particle across the wavelength separator as the particle is propagated along the flow stream through the interrogation region and a photodetector configured to detect light conveyed across the wavelength separator and generating a photodetector signal pulse in response to light detected from the wavelength separator.

In some embodiments, methods include detecting fluorescence from the particle. In other embodiments, methods include detecting scattered light from the particle. In other embodiments, methods include detecting fluorescence and scattered light from the particle. In some embodiments, light from the particle is continuously conveyed through a double telecentric lens across the wavelength separator. In some instances, the double telecentric lens conveys collimated and perpendicularly incident light from the irradiated particle to the wavelength separator. In some embodiments, methods include continuously irradiating the particle propagating along the flow stream across an interrogation region of the flow stream of 1 µm or more, such as 10 µm or more, such as for example across an interrogation region of 1 mm or more. In certain instances, the interrogation region of the flow stream where the propagating particle is irradiated ranges from 0.001 mm to 10 mm.

In some embodiments, methods include detecting light from a wavelength separator that is configured to pass light having different spectral ranges, such as spectral ranges of from 1 nm to 25 nm. In certain instances, the wavelength separator is configured to pass light having a spectral range of 10 nm. In some instances, the wavelength separator passes light having a predetermined range of wavelengths. In certain instances, the wavelength separator passes light having wavelengths that range from 200 nm to 1200 nm, such as from 360 nm to 960 nm. In some embodiments, the wavelength separator includes a linear variable optical filter. In some instances, the wavelength separator includes one or more linear variable bandpass filters. For example, the wavelength separator may include a long pass linear variable bandpass filter, a short pass linear variable bandpass filter or a combination of a long pass linear variable bandpass filter and a short pass linear variable bandpass filter. In other embodiments, the wavelength separator includes one or more linear variable edge filters. For example, the wavelength separator may include a long pass linear variable edge filter, a short pass linear variable edge filter or a combination of a long pass linear variable edge filter and a short pass linear variable edge filter.

In some embodiments, a photodetector signal pulse is generated in response to light detected from the wavelength separator. In some embodiments, methods include irradiating a particle propagating along a flow stream through an interrogation region where the light adjustment component is configured to continuously convey light from the particle across the wavelength separator component as the particle propagates along the flow stream through the interrogation region and generate photodetector signals in response to light detected from the wavelength separator. In some instances, a photodetector signal pulse is generated from the photodetector signals. In some instances, a photodetector signal pulse is generated from data signals collected across a predetermined spectral range of light. In certain instances, the photodetector signal pulse is generated from data signals collected across a spectrum having wavelengths from 200 nm to 1200 nm, such as from 360 nm to 960 nm.

In some embodiments, methods include characterizing a particle based on the pattern or shape of the photodetector signal pulse. For example, one or more parameters of the particle may be determined based on the photodetector signal pulse. In some instances, methods include identifying the particle based on the pattern or shape of the photodetector signal pulse. In some instances, a sort decision for sorting the particle is generated based on the identified particle. In certain instances, methods include sorting the particle based on the photodetector signal pulse.

BRIEF DESCRIPTION OF THE FIGURES

The invention may be best understood from the following detailed description when read in conjunction with the accompanying drawings. Included in the drawings are the following figures:

FIG. 2 depicts detecting light from a particle propagating along a flow stream through an interrogation region according to certain embodiments.

FIG. 3 depicts an illustration of a continuum of light beams conveyed from an irradiated particle propagating along a flow stream through an interrogation region according to certain embodiments.

DETAILED DESCRIPTION

Figure 1:
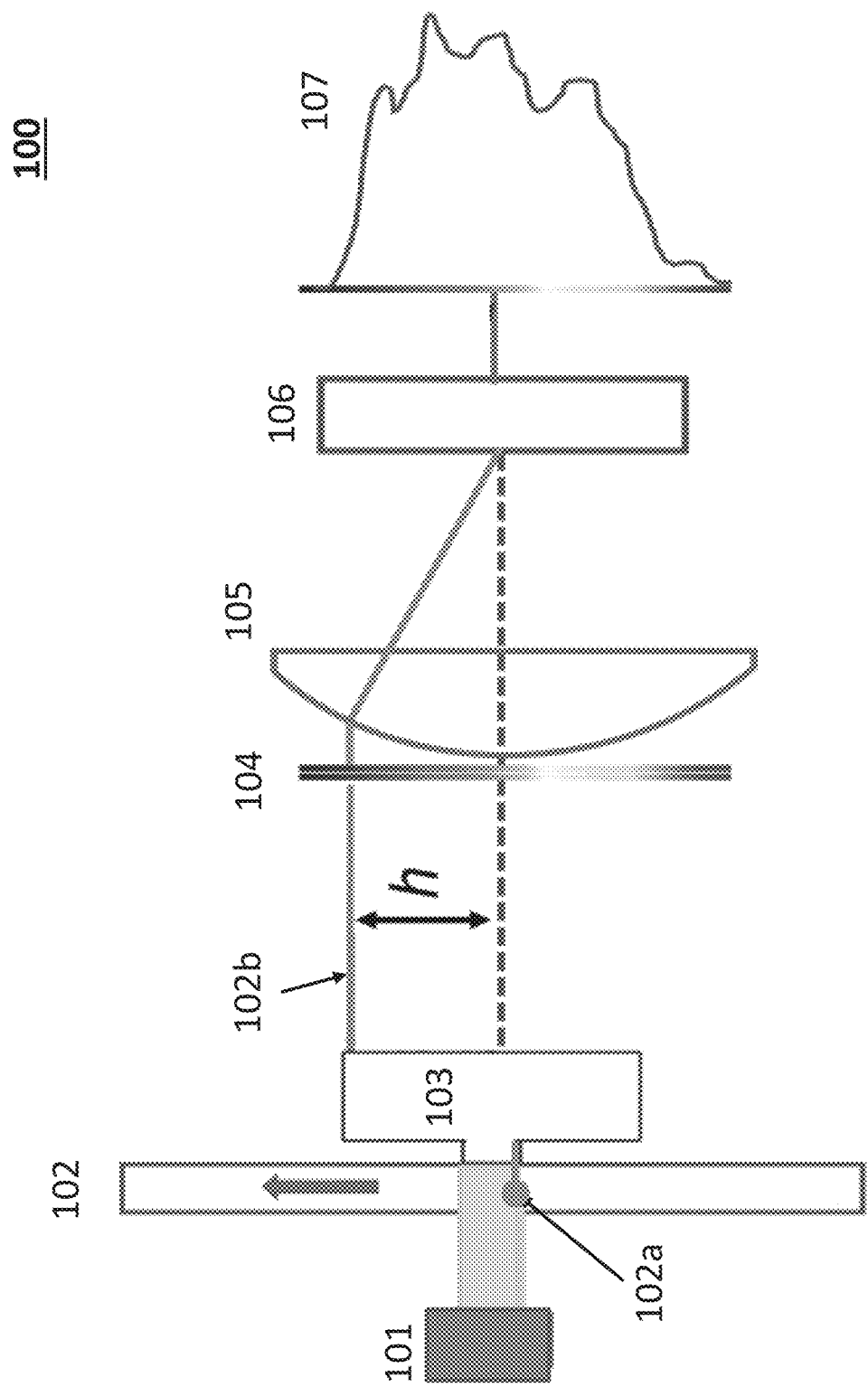
FIG. 1 depicts a light detection system for detecting light from a particle in a flow stream by spectral discrimination according to certain embodiments.

Aspects of the present disclosure include systems for detecting light from a particle in a flow stream by spectral discrimination. Systems according to certain embodiments include a light source configured to irradiate a particle propagating along a flow stream through an interrogation region, a light detection system that includes a wavelength separator component configured to pass light having a predetermined spectral range across the wavelength separator, a light adjustment component configured to continuously convey light from the irradiated particle across the wavelength separator as the particle is propagated along the flow stream through the interrogation region and a photodetector configured to detect light conveyed across the wavelength separator. Systems also include a processor for generating a photodetector signal pulse in response to light detected from the wavelength separator. Methods for detecting light with the subject systems are also described. Kits having one or more components for detecting light according to the subject methods are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112, they are to be accorded full statutory equivalents under 35 U.S.C. § 112.

As summarized above, the present disclosure provides systems and methods for detecting light from particles in a flow stream (e.g., in a particle analyzer) by spectral discrimination. In further describing embodiments of the disclosure, systems having a light source configured irradiate a particle propagating along a flow stream through an interrogation region, a light detection system that includes a wavelength separator component configured to pass light having a predetermined spectral range across the wavelength separator, a light adjustment component configured to continuously convey light from the irradiated particle across the wavelength separator as the particle is propagated along the flow stream through the interrogation region and a photodetector configured to detect light conveyed across the wavelength separator are first described in greater detail. Next, methods for detecting light by spectral discrimination with the subject systems are described. Kits having one or more components of the subject spectral discrimination detecting systems are described.

Systems for Detecting Light from Particles in a Flow Stream by Spectral Discrimination Aspects of the present disclosure include systems for detecting light from a particle in a flow stream by spectral discrimination. The term "spectral discrimination" is used herein in its conventional sense to refer to the differential detection of a spectrum of wavelengths of light from an irradiated particle, where in certain instances the differential detection of the spectrum of light from an irradiated particle may be used to identify or characterize the particle or component thereof. As described in greater detail below, the subject systems are configured to detect a plurality of different wavelengths of light emanating from an irradiated particle, where in some instances one or more data signals is generated in response to each different detected wavelength of light. In some embodiments, the subject systems provide for the detection of a spectrum of wavelengths of light from an irradiated particle using a single photodetector for each laser line.

Systems according to certain embodiments include a light source configured to irradiate a particle propagating along a flow stream through an interrogation region, a light detection system that includes a wavelength separator component configured to pass light having a predetermined spectral range across the wavelength separator, a light adjustment component configured to continuously convey light from the irradiated particle across the wavelength separator as the particle is propagated along the flow stream through the interrogation region and a photodetector configured to detect light conveyed across the wavelength separator.

In embodiments, systems include a light source for irradiating a particle propagating along a flow stream. In some embodiments, the light source continuously irradiates the particle propagating along the flow stream across an interrogation region of the flow stream of 0.1 µm or more, such as 0.5 µm or more, such as 1 µm or more, such as 5 µm or more, such as 10 µm or more, such as 15 µm or more, such as 20 µm or more, such as 25 µm or more, such as 50 µm or more, such as 75 µm or more, such as 100 µm or more, such as 250 µm or more, such as 500 µm or more, such as 750 µm or more, such as for example across an interrogation region of 1 mm or more, such as 2 mm or more, such as 3 mm or more, such as 4 mm or more, such as 5 mm or more, such as 6 mm or more, such as 7 mm or more, such as 8 mm or more, such as 9 mm or more and including 10 mm or more.

In some embodiments, the light source is configured to irradiate a planar cross-section of the propagated flow stream or may be configured to facilitate irradiation of a diffuse field (e.g., with a diffuse laser or lamp) of a predetermined length. In some embodiments, the region of the flow stream interrogated by the light source in the subject systems includes a transparent window that facilitates irradiation of a predetermined length of an emanating flow stream, such as 0.0001 mm or more, such as 0.0005 mm or more, such as 0.001 mm or more, such as 0.005 mm or more, such as 0.01 mm or more, such as 0.05 mm or more, such as 0.1 mm or more, such as 0.5 mm or more, such as 1 mm or more and including 5 mm or more. Depending on the light source used to irradiate the flow stream (as described below), the transparent window which facilitates irradiation of the flow stream by the light source may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In embodiments, systems include a light source for irradiating the particle in the flow stream. In some embodiments, the light source is a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In some embodiments, the light source includes one or more pulsed light sources, such as where light is emitted at predetermined time intervals, each time interval having a predetermined irradiation duration (i.e., pulse width). In certain embodiments, the pulsed light source is configured to irradiate the particle in each interrogation region of the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

Systems may include any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of LEDs. In certain instances, the light source includes a plurality of monochromatic light emitting diodes where each monochromatic light emitting diode outputs light having a different wavelength. In some instances, the light source includes a plurality of polychromatic light emitting diodes outputting light having a predetermined spectral width, such as where the plurality of polychromatic light emitting diodes collectively output light having a spectral width that ranges from 200 nm to 1500 nm, such as from 225 nm to 1475 nm, such as from 250 nm to 1450 nm, such as from 275 nm to 1425 nm, such as from 300 nm to 1400 nm, such as from 325 nm to 1375 nm, such as from 350 nm to 1350 nm, such as from 375 nm to 1325 nm, such as from 400 nm to 1300 nm, such as from 425 nm to 1275 nm, such as from 450 nm to 1250 nm, such as from 475 nm to 1225 nm and including from 500 nm to 1200 nm.

In certain embodiments, the light source includes a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

In some embodiments, the light source emits light having wavelengths that overlap, such as where the output spectrum of one or more components of the lights source overlap by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more. In some embodiments, the wavelengths of light emitted by the light sources exhibit no overlap. For example, the output spectrum of the light sources may be separated by 1 nm or more, such as by 2 nm or more, such as by 3 nm or more, such as by 4 nm or more, such as by 5 nm or more, such as by 6 nm or more, such as by 7 nm or more, such as by 8 nm or more, such as by 9 nm or more, such as by 10 nm or more and including by 20 nm or more.

The light source may be positioned by any suitable distance from the flow stream, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow stream such as at an angle ranging from 10° to 90°, such as from 15° to 85°, such as from 20° to 80°, such as from 25° to 75° and including from 30° to 60°, for example at a 90° angle.

Light sources according to certain embodiments may also include one or more optical adjustment components. The term "optical adjustment" is used herein in its conventional sense to refer to any device that is capable of changing the spatial width of irradiation or some other characteristic of irradiation from the light source, such as for example, irradiation direction, wavelength, beam width, beam intensity and focal spot. Optical adjustment protocols may be any convenient device which adjusts one or more characteristics of the light source, including but not limited to lenses, mirrors, filters, fiber optics, wavelength separators, pinholes, slits, collimating protocols and combinations thereof. In certain embodiments, systems of interest include one or more focusing lenses. The focusing lens, in one example may be a de-magnifying lens. In another example, the focusing lens is a magnifying lens. In other embodiments, systems of interest include one or more mirrors. In still other embodiments, systems of interest include fiber optics.

As described above, systems are configured to irradiate a particle propagating along a flow stream through an interrogation region and light from the irradiated particle is continuously conveyed through a light adjustment component across the wavelength separator as the particle is propagated along the flow stream through the interrogation region. In some instances, light from the irradiated particle is emitted light such as fluorescence from the particle. In some instances, light from the irradiated particle is scattered light. In some cases, the scattered light is forward scattered light. In some cases, the scattered light is backscattered light.

In some cases, the scattered light is side scattered light. In some instances light from the irradiated particle is transmitted light.

Light from the particle is continuously conveyed across the wavelength separator as the particle propagates along the flow stream in the interrogation region with a light adjustment component. In some instances, the light adjustment component is configured to expand the spatial separation of the light collected from the particle in the flow stream. In some instances, the light adjustment component expands the spatial separation by 5% or more, such as by 10% or more, such as by 25% or more, such as by 50% or more, such as by 75% or more, such as by 90% or more. In certain instances, the light adjustment component expands the spatial separation by 1.1-fold or more, such as by 1.2-fold or more, such as by 1.3-fold or more, such as by 1.4-fold or more, such as by 1.5-fold or more, such as by 2-fold or more, such as by 3-fold or more, such as by 4-fold or more, such as by 5-fold or more, such as by 6-fold or more, such as by 7-fold or more, such as by 8-fold or more, such as by 9-fold or more and including by 10-fold or more.

In some embodiments, the light adjustment component collimates the light collected from the particle and propagates collimated light to the wavelength separator. The term "collimate" is used in its conventional sense to refer to the optically adjusting the collinearity of light propagation or reducing divergence by the light of from a common axis of propagation. In some instances, collimating the light from the particle includes narrowing the spatial cross section of a light beam that is propagated to the wavelength separator. In other instances, the light adjustment compound changes the direction of the collimated light beam, such as changing the propagation of the light beam by 1° or more, such as by 5° or more, such as by 10° or more, such as by 15° or more, such as by 20° or more, such as by 25° or more, such as by 30° or more, such as by 45° or more, such as by 60° or more, such as by 75° or more and including changing the direction of light propagation by 90° or more. In yet other instances, the light adjustment component de-magnifies the light collected from the particle so as to decrease the dimensions of the light (e.g., beam spot) that is propagated to the wavelength separator, such as decreasing the dimensions by 5% or more, such as by 10% or more, such as by 25% or more, such as by 50% or more and including decreasing the dimensions by 75% or more.

In some embodiments, the light adjustment component is configured to convey incident light from the irradiated particle to the wavelength separator at an angle that varies from 60° to 90° relative to the surface of the wavelength separator, such as from 65° to 90°, such as from 70° to 90°, such as from 75° to 90°, 80° to 90° and including from 85° to 90° relative to the surface of the wavelength separator. In certain embodiments, the light adjustment component is configured to convey perpendicularly incident light from the irradiated particle to the surface of the wavelength separator (i.e., the incident light from the light adjustment component is orthogonal to the surface of the wavelength separator)

In some embodiments, the light adjustment component is configured to continuously convey light from the irradiated particle across an axis of the wavelength separator. In some instances, the light adjustment component is configured to continuously convey light from the irradiated particle across the horizontal axis of the wavelength separator. In other instances, the light adjustment component is configured to continuously convey light from the irradiated particle across the vertical axis of the wavelength separator. In certain instances, the light adjustment component is configured to continuously convey light from the irradiated particle across the axis of the wavelength separator that is identical to the axis of the flow stream. In one example, where the flow stream flows vertical (e.g., either up or down with particles traveling up or down), the wavelength separator component is positioned to be vertical such that the light adjustment component is configured to continuously convey light from the irradiated particle across the vertical axis of the wavelength separator. In another example, where the flow stream flows horizontal (e.g., side-to-side with particles traveling side-to-side), the wavelength separator component is positioned to be horizontal such that the light adjustment component is configured to continuously convey light from the irradiated particle across the horizontal axis of the wavelength separator.

The light adjustment component may be any convenient optical protocol for collecting and continuously conveying light across the wavelength separator from the particle propagating along the flow stream through the interrogation region. In some embodiments, the light adjustment component includes a compound lens. In certain embodiments, the light adjustment component includes a compound lens and one or more aperture stops, such as where the one or more aperture stops are positioned in the light adjustment component at the focal points of the compounds lens. The light adjustment component in certain instances includes a telecentric lens. In some instances, the light adjustment component includes an object-space telecentric lens. In some instances, the light adjustment component includes an image-space telecentric lens. In certain instances, the light adjustment component includes a double telecentric lens (e.g., a bi-telecentric lens).

In embodiments, light collected from the particle as it is propagated along the flow stream through the interrogation region is conveyed across the wavelength separator. The term "wavelength separator" is used herein in its conventional sense to refer to an optical component that is configured to separate light collected from the particle into predetermined sub-spectral ranges. In some embodiments, the wavelength separator is configured to separate collected light into predetermined spectral ranges by passing light having a predetermined spectral range and reflecting one or more remaining spectral ranges of light. In other embodiments, the wavelength separator is configured to separate collected light into predetermined spectral ranges by passing light having a predetermined spectral range and absorbing one or more remaining spectral ranges of light. In yet other embodiments, the wavelength separator is configured to spatially diffract collected light into predetermined spectral ranges.

The wavelength separator may be any convenient optical component that passes different wavelength ranges of light across the wavelength separator. In some embodiments, the wavelength separator component in the subject light detection systems includes one or more linear optical filters, such as 2 or more, such as 3 or more, such as 4 or more and including 5 or more linear optical filters. In some instances, the wavelength separator includes one or more linear variable bandpass filters such as 2 or more, such as 3 or more, such as 4 or more and including 5 or more linear variable bandpass. In certain instances, the wavelength separator includes a long pass linear variable bandpass filter. In certain embodiments, the long pass linear variable bandpass filter is a linear variable bandpass filter which passes wavelengths of light across the bandpass filter that are greater than 400 nm, greater than 450 nm, greater than 500 nm, greater than 550 nm, greater than 600 nm, greater than 650 nm, greater than 700 nm, greater than 750 nm, greater than 800 nm. In certain instances, the wavelength separator includes a short pass linear variable bandpass filter. In certain embodiments, the short pass linear variable bandpass filter is a linear variable linear variable bandpass filter which passes wavelengths of light across the bandpass filter that are 600 nm or less, 550 nm or less, 500 nm or less, 450 nm or less, 400 nm or less, 350 nm or less, 300 nm or less, 250 nm or less, 200 nm or less. In some embodiments, the wavelength separator component includes one or more long pass linear variable bandpass filters and one or more short pass linear variable bandpass filters. In certain embodiments, the wavelength separator component includes a long pass linear variable bandpass filter and a short pass linear variable bandpass filter.

In some embodiments, the wavelength separator includes one or more linear variable edge filters such as 2 or more, such as 3 or more, such as 4 or more and including 5 or more linear variable edge filters. In certain embodiments, the long pass linear variable edge filter is a linear variable edge filter which passes wavelengths of light across the edge filter that are greater than 400 nm, greater than 450 nm, greater than 500 nm, greater than 550 nm, greater than 600 nm, greater than 650 nm, greater than 700 nm, greater than 750 nm, greater than 800 nm. In certain instances, the wavelength separator includes a short pass linear variable edge filter. In certain embodiments, the short pass linear variable edge filter is a linear variable edge filter which passes wavelengths of light across the edge filter that are 600 nm or less, 550 nm or less, 500 nm or less, 450 nm or less, 400 nm or less, 350 nm or less, 300 nm or less, 250 nm or less, 200 nm or less. In some embodiments, the wavelength separator component includes one or more long pass linear variable edge filters and one or more short pass linear variable edge filters. In certain embodiments, the wavelength separator component includes a long pass linear variable edge filter and a short pass linear variable edge filter.

In embodiments, light conveyed across the wavelength separator component is propagated to a photodetector. In some embodiments, light from the wavelength separator is conveyed to the photodetector through an optical adjustment component. As described above, the optical adjustment component may include lens, mirrors, collimators, pinholes, slits, beam splitters, among other types of optical adjustment components. In some instances, light from the wavelength separator is propagated to the photodetector through a focusing lens. In some instances, light from the wavelength separator is propagated to the photodetector through an objective lens.

Photodetectors of the subject systems may be any convenient light detecting protocol, including but not limited to photosensors or photodetectors, such as avalanche photodiodes (APDs), active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

In embodiments of the present disclosure, the photodetector may be configured to detect light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light at 400 or more different wavelengths.

Photodetectors may be configured to measure light continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

The photodetectors may be configured to take measurements of the light one or more times during each discrete time interval, such as 2 or more times, such as 3 or more times, such as 5 or more times and including 10 or more times. In certain embodiments, light is measured by the photodetector 2 or more times, with the data in certain instances being averaged. Light from the particle in the flow stream may be detected in one or more photodetector channels, such as 2 or more, such as 3 or more, such as 4 or more, such as 5 or more, such as 6 or more, such as 7 or more, such as 8 or more, such as 9 or more and including 10 or more photodetector channels.

In some embodiments, light detection systems are configured to detect emitted light from the particle, such as particle luminescence (i.e., fluorescence or phosphorescence). In other embodiments, light detection systems are configured to detect transmitted light, such as where the light detection system includes a brightfield light detector. In certain embodiments, light detection systems are configured to detect scattered light. In embodiments, scattered light according to the present disclosure is not fluorescence or phosphorescence. In some embodiments, scattered light detected by scatter photodetectors of the subject systems includes Mie scattering by particles in the flow stream. In other embodiments, scattered light detected by scatter photodetectors of the subject systems includes Rayleigh scattering by particles in the flow stream. In still other embodiments, scattered light detected by scatter photodetectors of the subject systems includes Mie scattering and Rayleigh scattering by particles in the flow stream. The scatter photodetectors may be side scatter photodetectors, forward scatter photodetectors, back scatter photodetectors and combinations thereof.

In some embodiments, systems further include a processor configured to generate a photodetector data signal in response to light detected from the wavelength separator. In some embodiments, systems include memory operably coupled to the processor where the memory includes instructions stored thereon, which when executed by the processor, cause the processor to operate the system to a particle propagating along a flow stream in an interrogation region where the light adjustment component is configured to continuously convey light from the particle across the wavelength separator component as the particle propagates along the flow stream through the interrogation region and generate a plurality of photodetector data signals in response to light conveyed across the wavelength separator.

In some embodiments, the memory includes instructions which cause the processor to generate one or more data signals in each photodetector channel in response to detected light. In some instances, the memory includes instructions for generating a plurality of data signals in each photodetector channel in response to the detected light, such as generating 2 or more data signals, such as 3 or more data signals, such as 4 or more data signals, such as 5 or more data signals, such as 6 or more data signals, such as 7 or more data signals, such as 8 or more data signals, such as 9 or more data signals and including generating 10 or more data signals in each photodetector channel in response to detected light. In some instances, the memory includes instructions to generate one or more data signals in a different photodetector channel in response to light detected from the particle as it propagates through the flow stream.

In some embodiments, a photodetector signal pulse is generated from the plurality of photodetector data signals. In some instances, the photodetector signal pulse includes data signals collected across a predetermined spectral range of light. In certain instances, the photodetector signal pulse includes data signals collected across a spectrum having wavelengths that range from 100 nm to 1500 nm, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm and including passing light having wavelengths that range from 600 nm to 1000 nm. In some embodiments, the photodetector signal pulse generated includes data signals collected across a spectrum having wavelengths that range from 360 nm to 960 nm.

In some embodiments, each photodetector signal pulse has a unique shape or pattern. In certain embodiments, each photodetector signal pulse has an identifiable shape or pattern, such as where the photodetector signal pulse can be used to identify the components of the particle (e.g., fluorophores) or one or more parameters of the particle (e.g., particle shape, size). In certain embodiments, the memory includes instructions stored thereon for characterizing the fluorophore abundance of the particle based on the photodetector signal pulse. In other embodiments, the memory includes instructions stored thereon for identifying the types of fluorophores on the particle based on the photodetector signal pulse. In other embodiments, the memory includes instructions stored thereon for characterizing the size of the particle based on the photodetector signal pulse. In other embodiments, the memory includes instructions stored thereon for characterizing the center of mass of the particle based on the photodetector signal pulse. In other embodiments, the memory includes instructions stored thereon for characterizing the orientation of the particle based on the photodetector signal pulse. In other embodiments, the memory includes instructions stored thereon for characterizing the eccentricity of the particle based on the photodetector signal pulse. In other embodiments, the memory includes instructions stored thereon for determining if the co-localization coefficient (i.e., the degree of co-localization) of the particle based on the photodetector signal pulse. In some embodiments, the memory includes instructions stored thereon which when executed by the processor, cause the processor to identify the particle in the flow stream based on the photodetector signal pulse. In some embodiments, the memory includes instructions for generating a sort decision for the particle based on the photodetector signal pulse.

FIG. 1 depicts a light detection system according to certain embodiments. System 100 includes a light source 101 that is configured to irradiate particle 102a as the particle propagates along flow stream 102. A continuum of light beams from irradiated particle 102a is propagated through light adjustment component 103 (e.g., double telecentric lens) across wavelength separator 104 (e.g., one or more linear variable optical filters) as the irradiated particle along through flow stream 102. FIG. 1 depicts this as a beam of light 102b which emanates from irradiated particle 102a when particle 102a is at a position in the flow stream and is conveyed through light adjustment component 103. In some instances, wavelength separator 104 is a combination of a long pass linear variable bandpass filter and a short pass linear variable bandpass filter. Light beam 102b is displaced from the central optical axis of light adjustment component 103 by a distance h, which distance depends on the position of the in flow stream 102 when irradiated by light source 101. As described above, as particle 102a propagates along flow stream 102, light beams emanating from light adjustment component 103 will have changing distances h from the central axis of light adjustment component 103. Illustrative light beam 102b is conveyed to wavelength separator 104 and is propagated to photodetector 106 with focusing lens 105. Photodetector 106 generates data signals in response to the light that is continuously conveyed from light adjustment component 103 through wavelength separator 104 as the particle propagates along flow stream 102. Data signals from photodetector 106 together form a photodetector signal pulse 107, which is in certain instances has a shape or pattern that is unique to particle 102a.

Figure 2A:
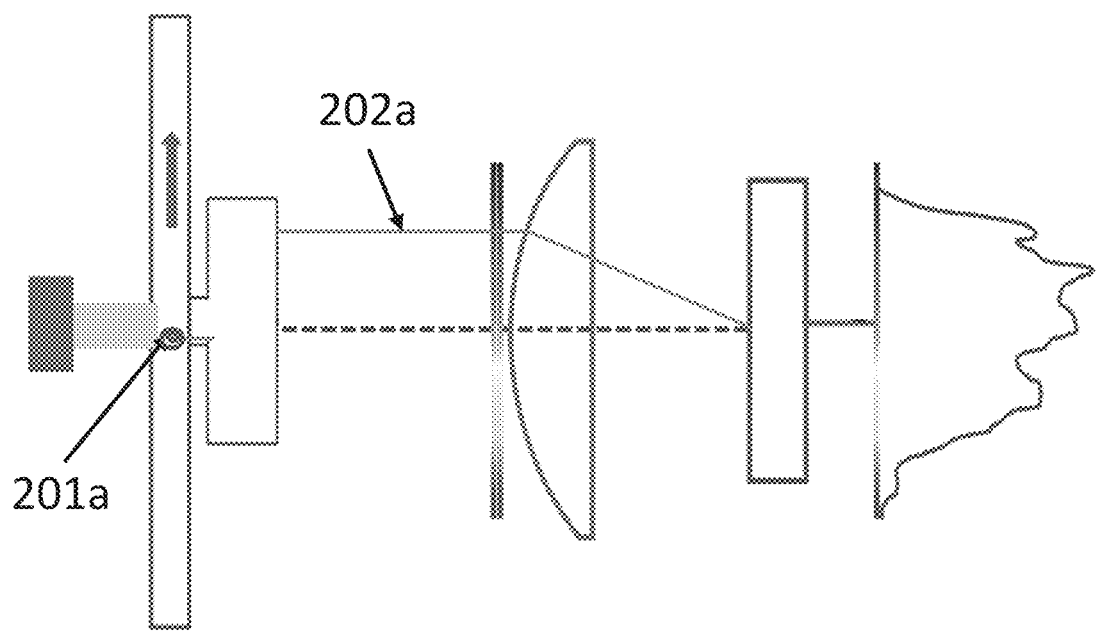
FIG. 2A depicts an illustrative light beam which emanates from an irradiated particle when the particle is at a first position in a flow stream.
Figure 2B:
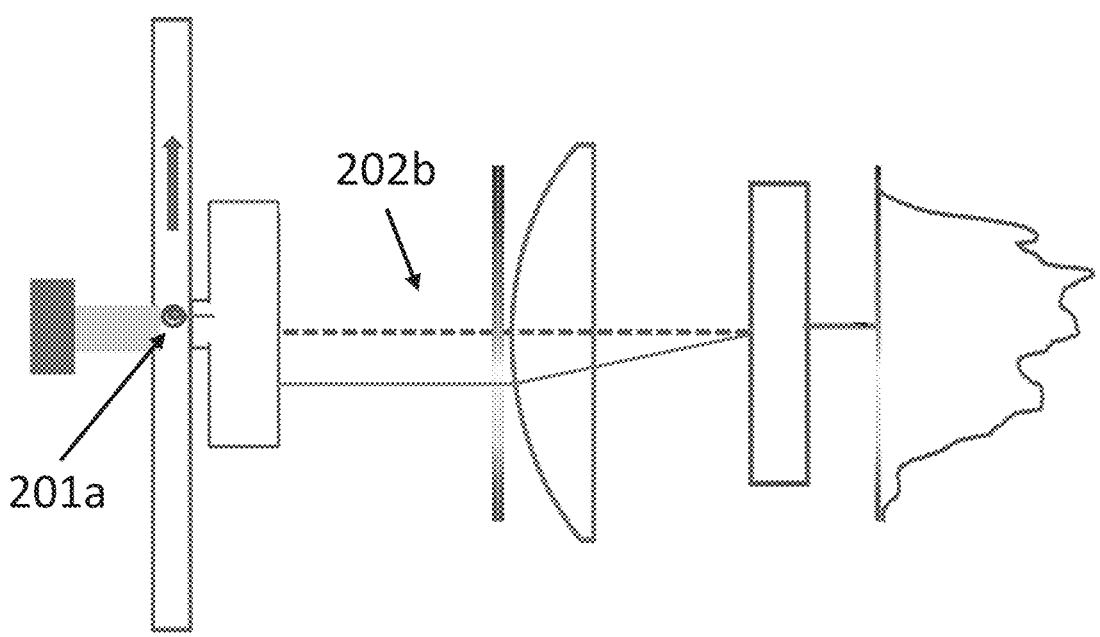
FIG. 2B depicts an illustrative light beam which emanates from an irradiated particle when the particle is at a second position in a flow stream.

FIG. 2 depicts detecting light from a particle propagating along a flow stream according to certain embodiments. FIG. 2A depicts detecting an illustrative light beam which emanates from an irradiated particle when the particle is at a first position in a flow stream with a light detection system as described above in FIG. 1. As discussed above, irradiation of particle 201a generates a continuum of light beams from irradiated particle 201a which is continuously conveyed through a light adjustment component across the wavelength separator. When particle 201a is at a first position in the flow stream, light from particle 201a (depicted in FIG. 2A as light beam 202a) which is conveyed through the light adjustment component is displaced from the central axis of the light adjustment component by a first distance. As particle 202a propagates through the flow stream, light beams emanating from light adjustment component will have changing distances h from the central axis of the light adjustment component. FIG. 2B depicts an illustrative light beam which emanates from irradiated particle 201a when the particle is at a different position in the flow stream.

FIG. 3 depicts an illustration of a continuum of light beams conveyed from an irradiated particle propagating along a flow stream in an interrogation region according to certain embodiments. Particle 302 is irradiated with light source 301 as it is propagated through a flow stream and light from the irradiated particle generates a continuum of light which is continuously conveyed through light adjustment 303 component across wavelength separator 304 (shown as five different beams 302a, depicted as illustrative light beams that emanates from the particle at the different positions in the flow stream) Light from the irradiated particle is continuously conveyed through light adjustment component 303 as it is propagated along the flow stream through the interrogation region and will have changing distances h from the central axis of light adjustment component 303. As the light conveyed through light adjustment component 303 is displaced from the central axis by changing distances, light from the irradiated particle will be conveyed across wavelength separator 304.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the nozzle orifice is 100 μm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 μL/min or more, such as 2 μL/min or more, such as 3 μL/min or more, such as 5 μL/min or more, such as 10 μL/min or more, such as 15 μL/min or more, such as 25 μL/min or more, such as 50 μL/min or more and including 100 μL/min or more, where in some instances the rate of sample conveyed to the flow cell chamber by the sample injection port is 1 μL/sec or more, such as 2 μL/sec or more, such as 3 μL/sec or more, such as 5 μL/sec or more, such as 10 μL/sec or more, such as 15 μL/sec or more, such as 25 μL/sec or more, such as 50 μL/sec or more and including 100 μL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 µL/min (microliter per minute) or more, such as 2 µL/min or more, such as 3 µL/min or more, such as 5 µL/min or more, such as 10 µL/min or more, such as 25 µL/min or more, such as 50 µL/min or more, such as 75 µL/min or more, such as 100 µL/min or more, such as 250 µL/min or more, such as 500 µL/min or more, such as 750 µL/min or more and including 1000 µL/min or more. For example, the system may include a pump that is configured to flow sample through the flow cell at a rate that ranges from 1 µL/min to 500 µL/min, such as from 1 uL/min to 250 uL/min, such as from 1 uL/min to 100 uL/min, such as from 2 µL/min to 90 µL/min, such as from 3 µL/min to 80 µL/min, such as from 4 µL/min to 70 µL/min, such as from 5 µL/min to 60 µL/min and including rom 10 µL/min to 50 µL/min. In certain embodiments, the flow rate of the flow stream is from 5 µL/min to 6 µL/min.

In certain embodiments, the subject systems are flow cytometric systems. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem. January;* 49(pt 1):17-28; Linden, et. al., *Semin Throm Hemost.* 2004 October; 30(5):502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g, cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, flow cytometry systems of the invention are configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Figure 4A:
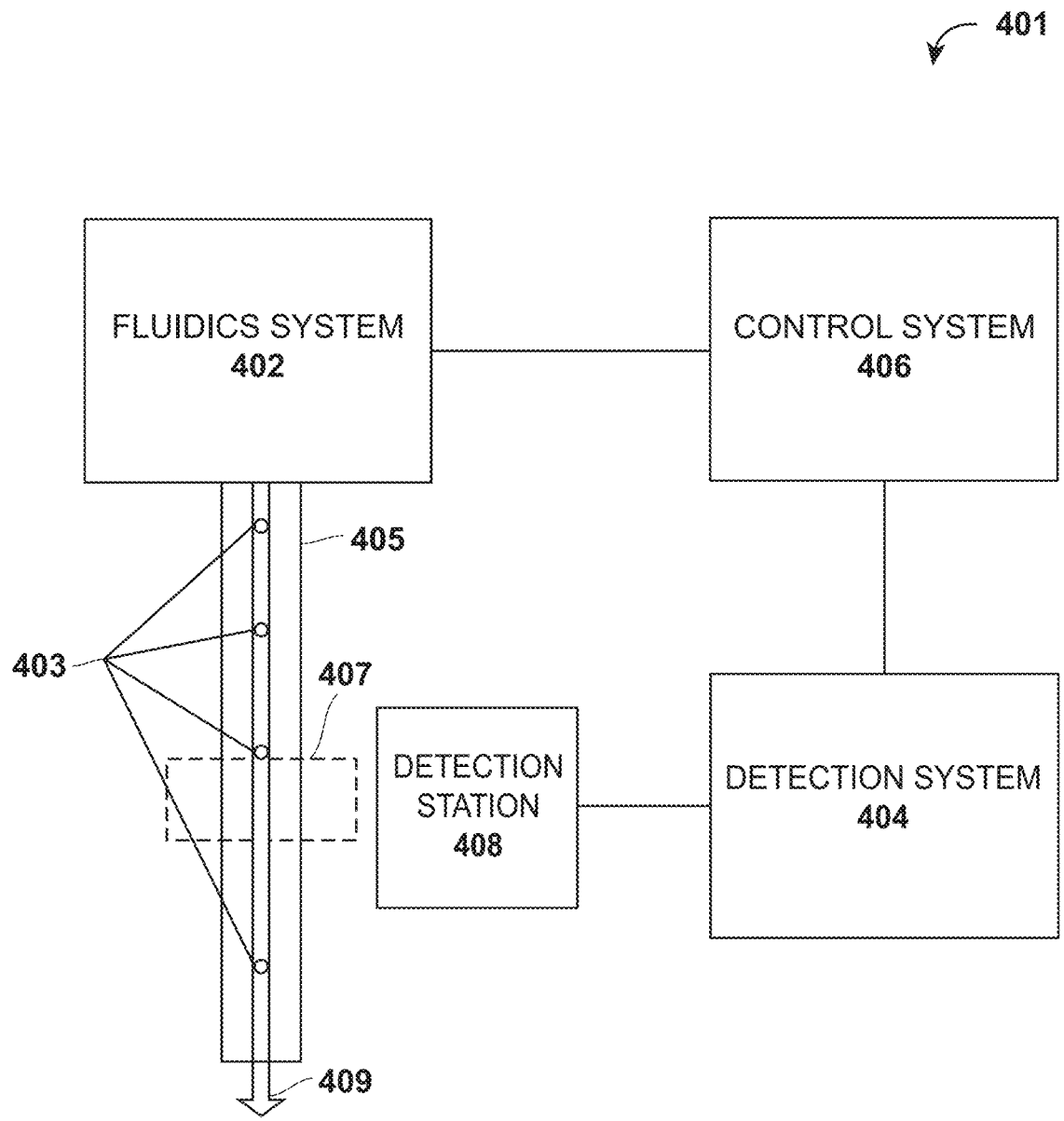
FIG. 4A depicts a functional block diagram of a particle analysis system according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
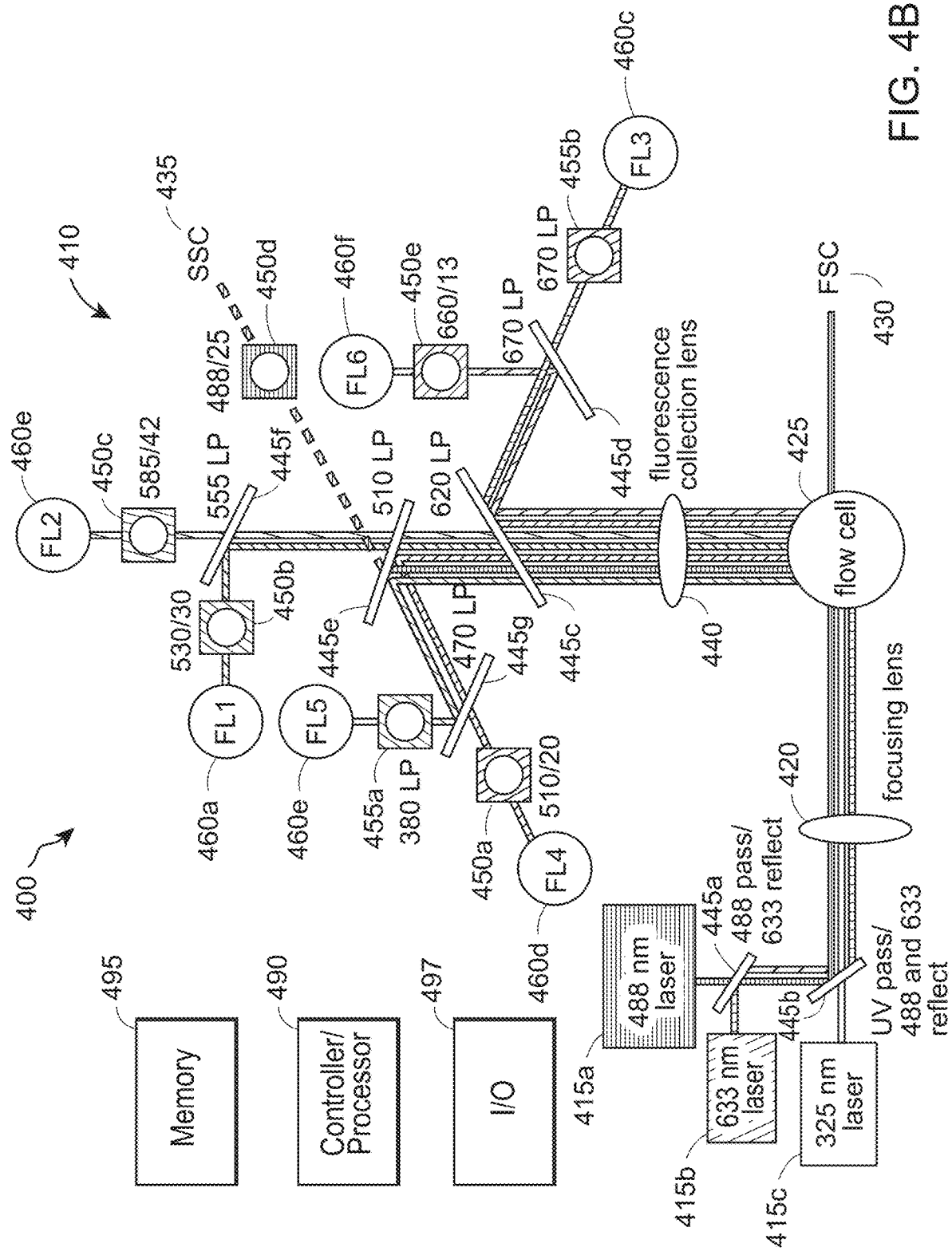
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 4C:
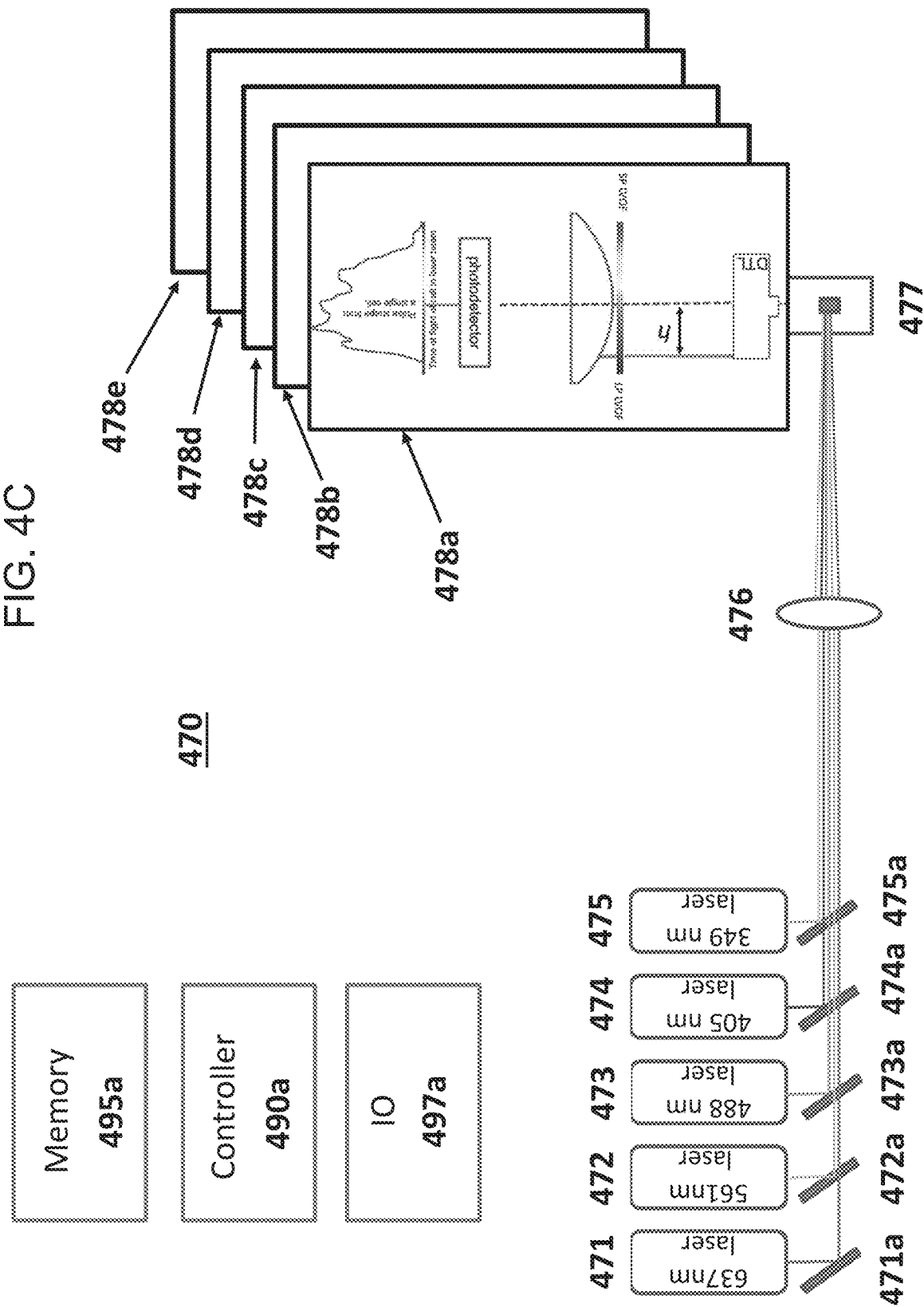
FIG. 4C depicts a flow cytometer system having a plurality of light detection modules according to certain embodiments.

In certain embodiments, systems for flow cytometry according to embodiments of the present disclosure are illustrated in FIG. 4C. System 470 includes laser 471 (e.g., 637 nm laser), laser 472 (e.g., 561 nm laser), laser 473 (e.g., 488 nm laser), laser 474 (e.g., 405 nm laser) and laser 475 (e.g., 349 nm laser) for irradiating a sample propagating in a flow stream through flow cell 477. Light from lasers 471-475 is conveyed to flow cell 477 with optical components 471a-475a which can include one or more collection lenses, beam splitters, bandpass filters and dichroic mirrors. Light from each laser is focused onto flow cell 477 through focusing lens 476.

The light from particles irradiated by each laser according to certain embodiments is detected with a distinct light detection module as described herein. As illustrated in FIG. 1, each light detection module includes an optical adjustment component such as a double telecentric lens and a wavelength separator component such as one or more linear variable bandpass filters (e.g., a combination of a long pass linear variable bandpass filter and a short pass linear variable bandpass filter or a combination of a long pass linear edge filter and a short pass linear edge filter). In FIG. 4C, light detection module 478a is configured to detect light from particles propagating through flow cell 477 that are irradiated with laser 471 (e.g., with the 637 nm laser); light detection module 478b is configured to detect light from particles propagating through flow cell 477 that are irradiated with laser 472 (e.g., with the 561 nm laser); light detection module 478c is configured to detect light from particles propagating through flow cell 477 that are irradiated with laser 473 (e.g., with the 488 nm laser); light detection module 478d is configured to detect light from particles propagating through flow cell 477 that are irradiated with laser 474 (e.g., with the 405 nm laser); and light detection module 478e is configured to detect light from particles propagating through flow cell 477 that are irradiated with laser 475 (e.g., with the 349 nm laser). In the embodiment depicted in FIG. 4C a distinct light detection module is used to detect light from the flow stream from each laser line. In embodiments, the light detection modules may be arranged at any position and at any angle along the flow stream. In certain instances, as shown in FIG. 4C the light detection modules are positioned in a row along the longitudinal axis of the flow stream. Depending on the position of irradiation by each of the lasers, the light detection modules may be separated from each other along the longitudinal axis of the flow stream by 1 mm or more, such as by 5 mm or more, such as by 10 mm or more, such as 25 mm or more, such as 50 mm or more, such as 100 mm or more and including by 250 mm or more.

System 470 also includes input/output (I/O) 497a which is configured to receive data regarding a flow cytometer experiment having a panel of fluorescent labels and a plurality of cell populations having a plurality of markers, each cell population having a subset of the plurality of markers. The I/O 497a can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495a. The controller/processor 490a can be configured to evaluate and identify one or more assignments of labels to markers.

Figure 5:
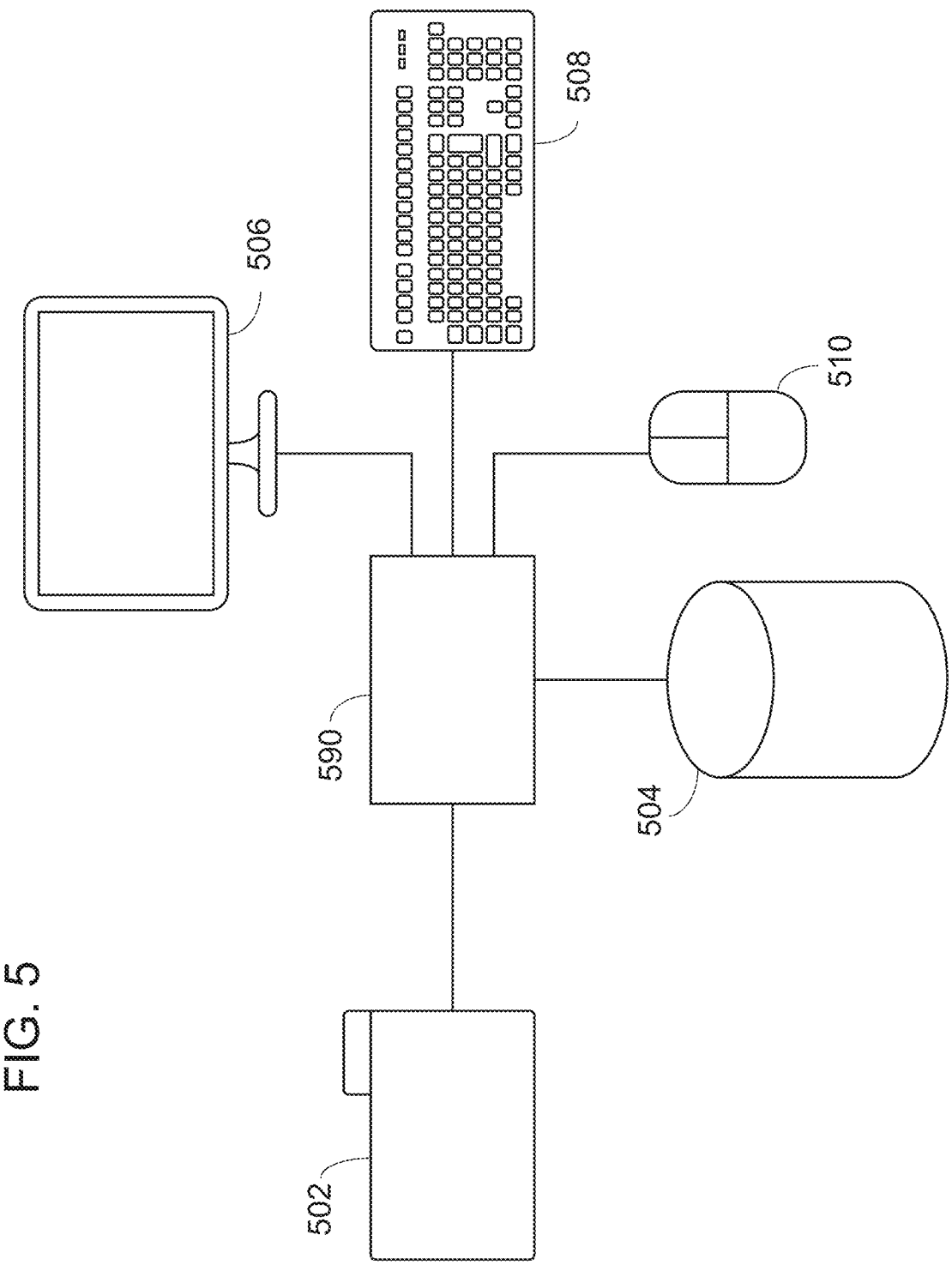
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
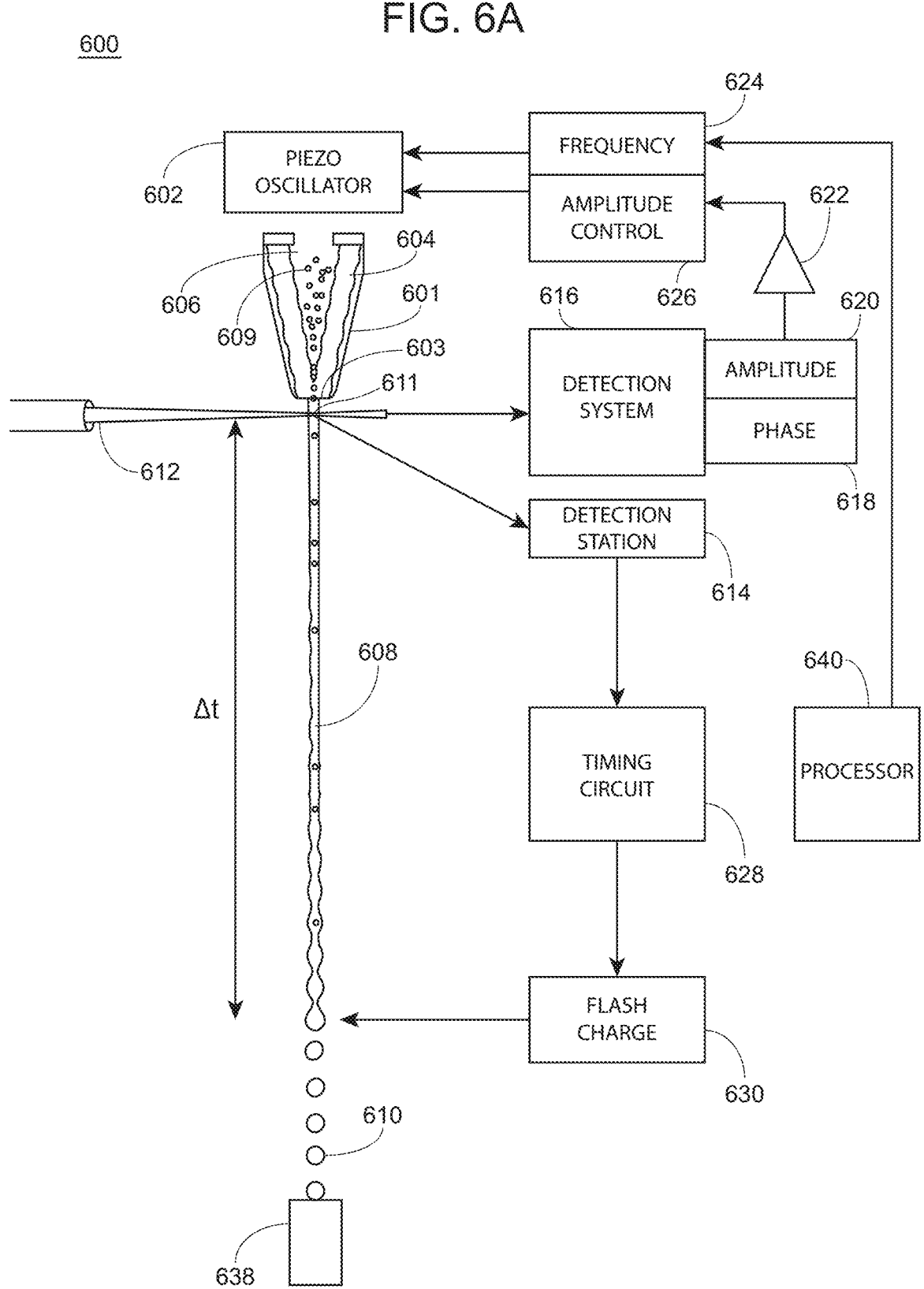
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay ($\Delta t$), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
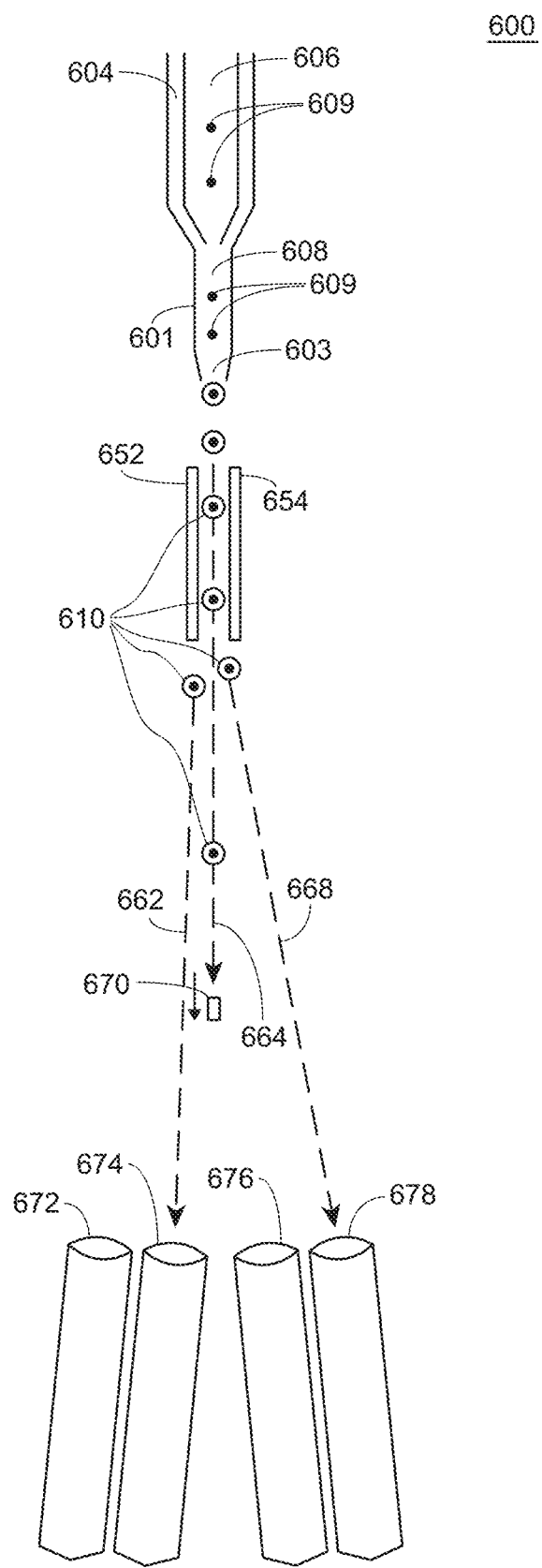
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for irradiating a particle propagating along a flow stream through an interrogation region with a light detection system having a wavelength separator component configured to pass light having a predetermined spectral range across the wavelength separator, a light adjustment component configured to continuously convey light from the irradiated particle across the wavelength separator as the particle is propagated along the flow stream through in the interrogation region and a photodetector configured to detect light conveyed across the wavelength separator and instructions for generating a photodetector signal pulse in response to light detected from the wavelength separator.

In some embodiments, the computer controlled systems include memory having instructions stored thereon for identifying the particle based on the photodetector signal pulse. In some embodiments, the computer controlled systems include memory having instructions stored thereon for characterizing the size of the particle based on the photodetector signal pulse. In other embodiments, the computer controlled systems include memory having instructions stored thereon for characterizing the center of mass of the particle based on the photodetector signal pulse. In other embodiments, the computer controlled systems include memory having instructions stored thereon for characterizing the orientation of the particle based on the photodetector signal pulse. In other embodiments, the computer controlled systems include memory having instructions stored thereon for characterizing the eccentricity of the particle based on the photodetector signal pulse. In other embodiments, the computer controlled systems include memory having instructions stored thereon for determining if the co-localization coefficient (i.e., the degree of co-localization) of the particle based on the photodetector signal pulse. In certain embodiments, the computer controlled systems include memory having instructions for generating a sort decision for the particle based on the photodetector signal pulse.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Oracle Solaris, Linux, OS/400, Compaq Tru64 Unix, SGI IRIX, Siemens Reliant Unix, and others.

Figure 7:
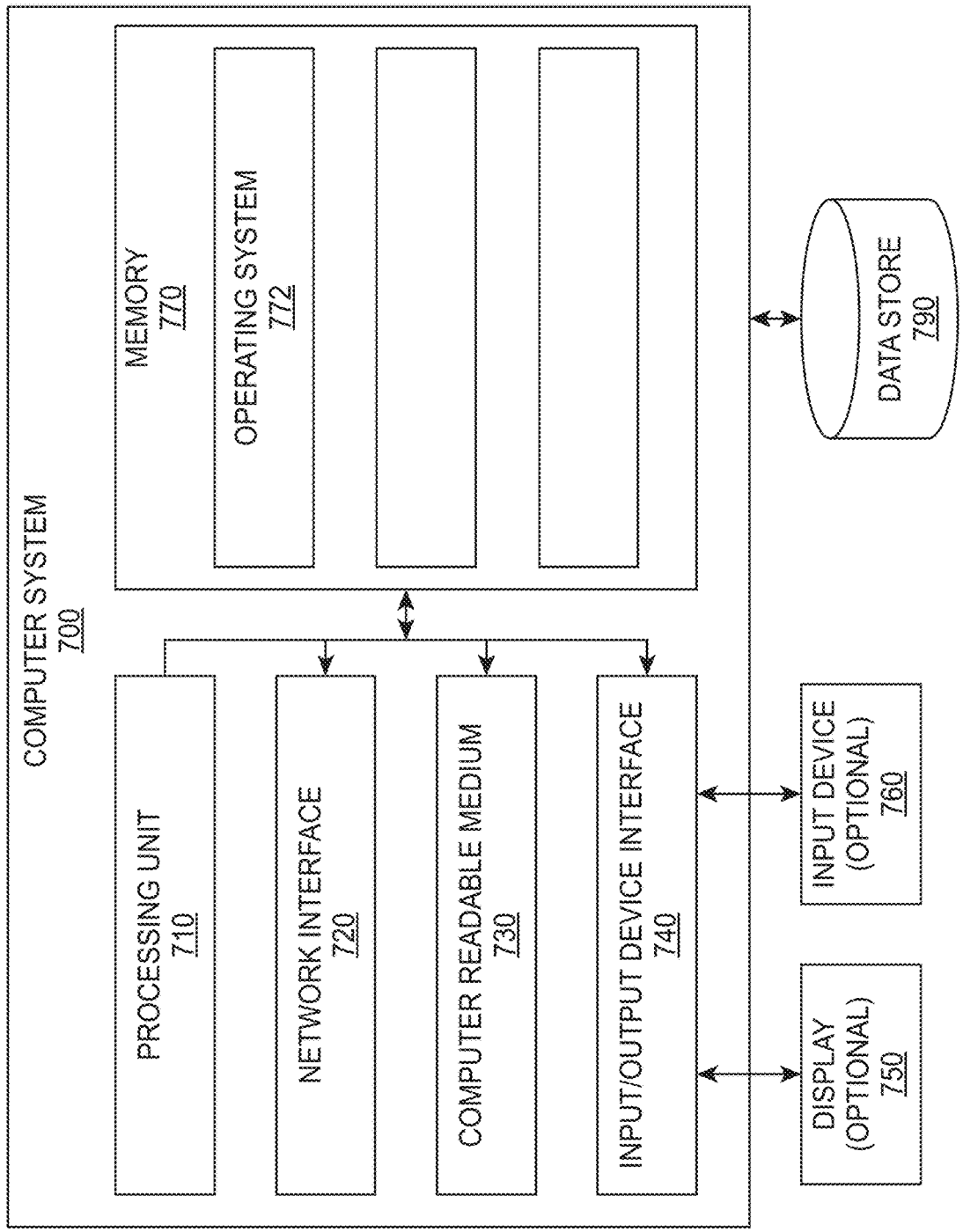
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Methods for Detecting Light from Particles in a Flow Stream by Spectral Discrimination As summarized above, aspects of the disclosure also include methods for detecting light from a particle in a flow stream by spectral discrimination. Methods according to certain embodiments include irradiating with a light source a particle propagating along a flow stream through an interrogation region, detecting light from the particle in the flow stream with a light detection system having a wavelength separator component configured to pass light having a predetermined spectral range across the wavelength separator, a light adjustment component configured to continuously convey light from the irradiated particle across the wavelength separator as the particle is propagated along the flow stream through the interrogation region and a photodetector configured to detect light conveyed across the wavelength separator and generating a photodetector signal pulse in response to light detected from the wavelength separator.

Methods according to certain embodiments include irradiating a particle propagating along the flow stream across an interrogation region of the flow stream of 1 μm or more, 5 μm or more, such as 10 μm or more, such as 15 μm or more, such as 20 μm or more, such as 25 μm or more, such as 50 μm or more, such as 75 μm or more, such as 100 μm or more, such as 250 μm or more, such as 500 μm or more, such as 750 μm or more, such as for example across an interrogation region of 1 mm or more, such as 2 mm or more, such as 3 mm or more, such as 4 mm or more, such as 5 mm or more, such as 6 mm or more, such as 7 mm or more, such as 8 mm or more, such as 9 mm or more and including 10 mm or more.

In some embodiments, methods include irradiating the particle in the flow stream with a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, methods may include irradiating the particle in the flow stream with a continuous light source that provides for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less.

In other embodiments, methods include irradiating the particle in the flow stream with a pulsed light source, such as where light is emitted at predetermined time intervals, each time interval having a predetermined irradiation duration (i.e., pulse width). In certain embodiments, methods include irradiating the particle with the pulsed light source in the interrogation region of the flow stream with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

As described above, the particle may be irradiated with any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of LEDs. In certain instances, the light source includes a plurality of monochromatic light emitting diodes where each monochromatic light emitting diode outputs light having a different wavelength. In some instances, the light source includes a plurality of polychromatic light emitting diodes outputting light having a predetermined spectral width, such as where the plurality of polychromatic light emitting diodes collectively output light having a spectral width that ranges from 200 nm to 1500 nm, such as from 225 nm to 1475 nm, such as from 250 nm to 1450 nm, such as from 275 nm to 1425 nm, such as from 300 nm to 1400 nm, such as from 325 nm to 1375 nm, such as from 350 nm to 1350 nm, such as from 375 nm to 1325 nm, such as from 400 nm to 1300 nm, such as from 425 nm to 1275 nm, such as from 450 nm to 1250 nm, such as from 475 nm to 1225 nm and including from 500 nm to 1200 nm.

In certain embodiments, methods include irradiating the particle with a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The particle in the flow stream may be irradiated by the light source from any suitable distance, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, irradiation of the flow stream may be at any suitable angle such as at an angle ranging from 10° to 90°, such as from 15° to 85°, such as from 20° to 80°, such as from 25° to 75° and including from 30° to 60°, for example at a 90° angle.

In practicing the subject methods, light from the irradiated particle is continuously conveyed through a light adjustment component across the wavelength separator. In some instances, light conveyed from the irradiated particle is emitted light such as fluorescence from the particle. In some instances, light conveyed from the irradiated particle is scattered light. In some cases, the scattered light is forward scattered light. In some cases, the scattered light is backscattered light. In some cases, the scattered light is side scattered light. In some instances light conveyed from the irradiated particle is transmitted light. Light from the particle is continuously conveyed across the wavelength separator as the particle propagates along the flow stream through the interrogation region with a light adjustment component. In some instances, the light adjustment component is configured to expand the spatial separation of the light collected from the particle in the flow stream. In some instances, the light adjustment component expands the spatial separation by 5% or more, such as by 10% or more, such as by 25% or more, such as by 50% or more, such as by 75% or more, such as by 90% or more. In certain instances, the light adjustment component expands the spatial separation by 1.1-fold or more, such as by 1.2-fold or more, such as by 1.3-fold or more, such as by 1.4-fold or more, such as by 1.5-fold or more, such as by 2-fold or more, such as by 3-fold or more, such as by 4-fold or more, such as by 5-fold or more, such as by 6-fold or more, such as by 7-fold or more, such as by 8-fold or more, such as by 9-fold or more and including by 10-fold or more.

The light adjustment component may be any convenient optical protocol for collecting and propagating light from the particle to the wavelength separator. In some embodiments, the light adjustment component collimates the light collected from the particle and conveys collimated light across the wavelength separator. In some embodiments, the light adjustment component conveys incident light from the irradiated particle to the wavelength separator at an angle that varies from 60° to 90° relative to the surface of the birefringent polarizing interferometer, such as from 65° to 90°, such as from 70° to 90°, such as from 75° to 90°, 80° to 90° and including from 85° to 90° relative to the surface of the wavelength separator. In certain embodiments, the light adjustment component conveys perpendicularly incident light from the irradiated particle to the surface of the wavelength separator (i.e., the incident light from the light adjustment component is orthogonal to the surface of the wavelength separator)

The light adjustment component may be any convenient optical protocol for collecting and continuously conveying light across the wavelength separator from the particle propagating along the flow stream through the interrogation region. In some embodiments, the light adjustment component includes a compound lens. In certain embodiments, the light adjustment component includes a compound lens and one or more aperture stops, such as where the one or more aperture stops are positioned in the light adjustment component at the focal points of the compounds lens. The light adjustment component in certain instances includes a telecentric lens. In some instances, the light adjustment component includes an object-space telecentric lens. In some instances, the light adjustment component includes an image-space telecentric lens. In certain instances, the light adjustment component includes a double telecentric lens (e.g., a bi-telecentric lens).

In embodiments, light collected from the particle is continuously conveyed to across the wavelength separator (e.g., a continuum of different positions along the wavelength separator as described in greater detail below). Depending on the rate of the flow stream (i.e., the rate of particle propagation), light may be conveyed across the wavelength separator at a rate of 0.000001 mm/second or more, such as 0.000005 mm/second or more, such as 0.00001 mm/second or more, such as 0.00005 mm/second or more, such as 0.0001 mm/second or more, such as 0.0005 mm/second or more, such as 0.001 mm/second or more, such as 0.005 mm/second or more, such as 0.01 mm/second or more, such as 0.05 mm/second or more, such as 0.1 mm/second or more, such as 0.5 mm/second or more and including 1 mm/second or more.

In certain instances, the wavelength separator passes light having wavelengths that range from 200 nm to 1200 nm, such as from 360 nm to 960 nm. In some embodiments, the wavelength separator includes a linear variable optical filter. In some instances, the wavelength separator includes one or more linear variable bandpass filters. For example, the wavelength separator may include a long pass linear variable bandpass filter, a short pass linear variable bandpass filter or a combination of a long pass linear variable bandpass filter and a short pass linear variable bandpass filter. In other embodiments, the wavelength separator includes one or more linear variable edge filters. For example, the wavelength separator may include a long pass linear variable edge filter, a short pass linear variable edge filter or a combination of a long pass linear variable edge filter and a short pass linear variable edge filter.

Light from the particle is conveyed from the wavelength separator and detected by a photodetector. In some embodiments, light is conveyed from the wavelength separator to the photodetector through an optical adjustment component. As described above, the optical adjustment component may include lens, mirrors, collimators, pinholes, slits, beam splitters, among other types of optical adjustment components. In some instances, light from the wavelength separator is propagated through a focusing lens to the photodetector. In some instances, light from the wavelength separator is propagated through an objective lens to the photodetector. The properties of the objective lens may vary. For example, the numerical aperture of the subject objective lens may also vary, ranging from 0.01 to 1.7, such as from 0.05 to 1.6, such as from 0.1 to 1.5, such as from 0.2 to 1.4, such as from 0.3 to 1.3, such as from 0.4 to 1.2, such as from 0.5 to 1.1 and including a numerical aperture ranging from 0.6 to 1.0. Likewise, the focal length of the objective lens varies, ranging from 10 mm to 20 mm, such as from 10.5 mm to 19 mm, such as from 11 mm to 18 mm and including from 12 mm to 15 mm.

In embodiments, light detection systems include one or more photodetectors, such as 2 or more, such as 3 or more, such as 4 or more, such as 5 or more, such as 6 or more, such as 7 or more, such as 8 or more, such as 9 or more and including 10 or more photodetectors. Photodetectors for practicing the subject methods may be any convenient light detecting protocol, including but not limited to photosensors or photodetectors, such as active-pixel sensors (APSs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Light may be measured by the photodetector at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the light from the light source may be taken one or more times during each discrete time interval, such as 2 or more times, such as 3 or more times, such as 5 or more times and including 10 or more times. In certain embodiments, the light from the light source is measured by the photodetector 2 or more times, with the data in certain instances being averaged.

In some embodiments, light detected from the particle is transmitted light, such as light detected with a brightfield light detector. In other embodiments, light detected from each particle is emitted light, such as particle luminescence (i.e., fluorescence or phosphorescence). In these embodiments, each particle may include one or more fluorophores which emits fluorescence in response to irradiation by the two or more light sources. For example, each particle may include 2 or more fluorophores, such as 3 or more, such as 4 or more, such as 5 or more, such as 6 or more, such as 7 or more, such as 8 or more, such as 9 or more and including 10 or more fluorophores. In some instances, each particle includes a fluorophore which emits fluorescence in response to irradiation by the light source. In some embodiments, fluorophores of interest may include but are not limited to dyes suitable for use in analytical applications (e.g., flow cytometry, imaging, etc.), such as an acridine dye, anthraquinone dyes, arylmethane dyes, diarylmethane dyes (e.g., diphenyl methane dyes), chlorophyll containing dyes, triarylmethane dyes (e.g., triphenylmethane dyes), azo dyes, diazonium dyes, nitro dyes, nitroso dyes, phthalocyanine dyes, cyanine dyes, asymmetric cyanine dyes, quinon-imine dyes, azine dyes, eurhodin dyes, safranin dyes, indamins, indophenol dyes, fluorine dyes, oxazine dye, oxazone dyes, thiazine dyes, thiazole dyes, xanthene dyes, fluorene dyes, pyronin dyes, fluorine dyes, rhodamine dyes, phenanthridine dyes, as well as dyes combining two or more of the aforementioned dyes (e.g., in tandem), polymeric dyes having one or more monomeric dye units and mixtures of two or more of the aforementioned dyes thereof. A large number of dyes are commercially available from a variety of sources, such as, for example, Molecular Probes (Eugene, OR), Dyomics GmbH (Jena, Germany), Sigma-Aldrich (St. Louis, MO), Sirigen, Inc. (Santa Barbara, CA) and Exciton (Dayton, OH). For example, the fluorophore may include 4-acetamido-4'-isothiocyanatostilbene-2,2'disulfonic acid;

acridine and derivatives such as acridine, acridine orange, acridine yellow, acridine red, and acridine isothiocyanate; allophycocyanin, phycoerythrin, peridinin-chlorophyll protein, 5-(2'-aminoethyl)aminonaphthalene-1-sulfonic acid (EDANS); 4-amino-N-[3-vinylsulfonyl)phenyl]naphthalimide-3,5 disulfonate (Lucifer Yellow VS); N-(4-anilino-1-naphthyl)maleimide; anthranilamide; Brilliant Yellow; coumarin and derivatives such as coumarin, 7-amino-4-methylcoumarin (AMC, Coumarin 120), 7-amino-4-trifluoromethylcouluarin (Coumaran 151); cyanine and derivatives such as cyanosine, Cy3, Cy3.5, Cy5, Cy5.5, and Cy7; 4',6-diaminidino-2-phenylindole (DAPI); 5', 5"-dibromopyrogallol-sulfonephthalein (Bromopyrogallol Red); 7-diethylamino-3-(4'-isothiocyanatophenyl)-4-methylcoumarin; diethylaminocoumarin; diethylenetriamine pentaacetate; 4,4'-diisothiocyanatodihydro-stilbene-2,2'-disulfonic acid; 4,4'-diisothiocyanatostilbene-2,2'-disulfonic acid; 5-[dimethylamino]naphthalene-1-sulfonyl chloride (DNS, dansyl chloride); 4-(4'-dimethylaminophenylazo)benzoic acid (DABCYL); 4-dimethylaminophenylazophenyl-4'-isothiocyanate (DABITC); eosin and derivatives such as eosin and eosin isothiocyanate; erythrosin and derivatives such as erythrosin B and erythrosin isothiocyanate; ethidium; fluorescein and derivatives such as 5-carboxyfluorescein (FAM), 5-(4,6-dichlorotriazin-2-yl)aminofluorescein (DTAF), 2'7'-dimethoxy-4'5'-dichloro-6-carboxyfluorescein (JOE), fluorescein isothiocyanate (FITC), fluorescein chlorotriazinyl, naphthofluorescein, and QFITC (XRITC); fluorescamine; IR144; IR1446; Green Fluorescent Protein (GFP); Reef Coral Fluorescent Protein (RCFP); Lissamine™; Lissamine rhodamine, Lucifer yellow; Malachite Green isothiocyanate; 4-methylumbelliferone; ortho cresolphthalein; nitrotyrosine; pararosaniline; Nile Red; Oregon Green; Phenol Red; B-phycoerythrin; o-phthaldialdehyde; pyrene and derivatives such as pyrene, pyrene butyrate and succinimidyl 1-pyrene butyrate; Reactive Red 4 (Cibacron™ Brilliant Red 3B-A); rhodamine and derivatives such as 6-carboxy-X-rhodamine (ROX), 6-carboxyrhodamine (R6G), 4,7-dichlororhodamine lissamine, rhodamine B sulfonyl chloride, rhodamine (Rhod), rhodamine B, rhodamine 123, rhodamine X isothiocyanate, sulforhodamine B, sulforhodamine 101, sulfonyl chloride derivative of sulforhodamine 101 (Texas Red), N,N,N',N'-tetramethyl-6-carboxyrhodamine (TAMRA), tetramethyl rhodamine, and tetramethyl rhodamine isothiocyanate (TRITC); riboflavin; rosolic acid and terbium chelate derivatives; xanthene; dye-conjugated polymers (i.e., polymer-attached dyes) such as fluorescein isothiocyanate-dextran as well as dyes combining two or more dyes (e.g., in tandem), polymeric dyes having one or more monomeric dye units and mixtures of two or more of the aforementioned dyes or combinations thereof.

In some instances, the fluorophore is polymeric dye. In some instances of the method, the polymeric dye includes a conjugated polymer. Conjugated polymers (CPs) are characterized by a delocalized electronic structure which includes a backbone of alternating unsaturated bonds (e.g., double and/or triple bonds) and saturated (e.g., single bonds) bonds, where π-electrons can move from one bond to the other. As such, the conjugated backbone may impart an extended linear structure on the polymeric dye, with limited bond angles between repeat units of the polymer. For example, proteins and nucleic acids, although also polymeric, in some cases do not form extended-rod structures but rather fold into higher-order three-dimensional shapes. In addition, CPs may form "rigid-rod" polymer backbones and experience a limited twist (e.g., torsion) angle between monomer repeat units along the polymer backbone chain. In some instances, the polymeric dye includes a CP that has a rigid rod structure. The structural characteristics of the polymeric dyes can have an effect on the fluorescence properties of the molecules.

Polymeric dyes of interest include, but are not limited to, those dyes described by Gaylord et al. in U.S. Publication Nos. 20040142344, 20080293164, 20080064042, 20100136702, 20110256549, 20110257374, 20120028828, 20120252986, 20130190193, 20160264737, 20160266131, 20180231530, 20180009990, 20180009989, and 20180163054, the disclosures of which are herein incorporated by reference in their entirety; and Gaylord et al., J. Am. Chem. Soc., 2001, 123 (26), pp 6417-6418; Feng et al., Chem. Soc. Rev., 2010,39, 2411-2419; and Traina et al., J. Am. Chem. Soc., 2011, 133 (32), pp 12600-12607, the disclosures of which are herein incorporated by reference in their entirety.

The polymeric dye may have one or more desirable spectroscopic properties, such as a particular absorption maximum wavelength, a particular emission maximum wavelength, extinction coefficient, quantum yield, and the like (see e.g., Chattopadhyay et al., "Brilliant violet fluorophores: A new class of ultrabright fluorescent compounds for immunofluorescence experiments." Cytometry Part A, 81A (6), 456-466, 2012). In some embodiments, the polymeric dye has an absorption curve between 280 nm and 475 nm. In certain embodiments, the polymeric dye has an absorption maximum (excitation maximum) in the range 280 nm and 475 nm. In some embodiments, the polymeric dye absorbs incident light having a wavelength in the range between 280 nm and 475 nm. In some embodiments, the polymeric dye has an emission maximum wavelength ranging from 400 nm to 850 nm, such as 415 nm to 800 nm, where specific examples of emission maxima of interest include, but are not limited to: 421 nm, 510 nm, 570 nm, 602 nm, 650 nm, 711 nm and 786 nm. In some instances, the polymeric dye has an emission maximum wavelength in a range selected from the group consisting of 410 nm to 430 nm, 500 nm to 520 nm, 560 nm to 580 nm, 590 nm to 610 nm, 640 nm to 660 nm, 700 nm to 720 nm, and 775 nm to 795 nm. In certain embodiments, the polymeric dye has an emission maximum wavelength of 421 nm. In some instances, the polymeric dye has an emission maximum wavelength of 510 nm. In some cases, the polymeric dye has an emission maximum wavelength of 570 nm. In certain embodiments, the polymeric dye has an emission maximum wavelength of 602 nm. In some instances, the polymeric dye has an emission maximum wavelength of 650 nm. In certain cases, the polymeric dye has an emission maximum wavelength of 711 nm. In some embodiments, the polymeric dye has an emission maximum wavelength of 786 nm. In certain instances, the polymeric dye has an emission maximum wavelength of 421 nm±5 nm. In some embodiments, the polymeric dye has an emission maximum wavelength of 510 nm±5 nm. In certain instances, the polymeric dye has an emission maximum wavelength of 570 nm±5 nm. In some instances, the polymeric dye has an emission maximum wavelength of 602 nm±5 nm. In some embodiments, the polymeric dye has an emission maximum wavelength of 650 nm±5 nm. In certain instances, the polymeric dye has an emission maximum wavelength of 711 nm±5 nm. In some cases, the polymeric dye has an emission maximum wavelength of 786 nm±5 nm. In certain embodiments, the polymeric dye has an emission maximum selected from the group consisting of 421 nm, 510 nm, 570 nm, 602 nm, 650 nm, 711 nm and 786 nm.

Specific polymeric dyes that may be employed include, but are not limited to, BD Horizon Brilliant™ Dyes, such as BD Horizon Brilliant™ Violet Dyes (e.g., BV421, BV510, BV605, BV650, BV711, BV786); BD Horizon Brilliant™ Ultraviolet Dyes (e.g., BUV395, BUV496, BUV737, BUV805); and BD Horizon Brilliant™ Blue Dyes (e.g., BB515) (BD Biosciences, San Jose, CA).

In certain embodiments, light detected from the particle is scattered light. The term "scattered light" is used herein in its conventional sense to refer to the propagation of light energy from the particle that are deflected from the incident beam path, such as by reflection, refraction or deflection of the beam of light. In certain instances, scattered light detected from the particle in the flow stream is forward scattered light (FSC). In other instances, scattered light detected from the particles in the flow stream is side scattered light. In yet other instances, scattered light detected from the particles in the flow stream is back-scattered light.

Light from the particle is detected in two or more photodetector channels, such as 3 or more, such as 4 or more, such as 5 or more, such as 6 or more, such as 7 or more, such as 8 or more, such as 9 or more and including 10 or more photodetector channels. In some embodiments, methods include generating a photodetector signal pulse in response to light detected from the wavelength separator. In some embodiments, methods include generating one or more signal pulses in each photodetector channel in response to detected light. In some instances, methods include generating a plurality of data signals in each photodetector channel in response to the detected light, such as generating 2 or more data signals, such as 3 or more data signals, such as 4 or more data signals, such as 5 or more data signals, such as 6 or more data signals, such as 7 or more data signals, such as 8 or more data signals, such as 9 or data signals and including generating 10 or more data signals in each photodetector channel in response to the detected light. In some instances, the methods include generating one or more data signals in a different photodetector channel in response to light detected from the particle across the wavelength separator.

In some embodiments, a photodetector signal pulse is generated from the plurality of photodetector data signals. In some instances, the photodetector signal pulse includes data signals collected across a predetermined spectral range of light. In certain instances, the photodetector signal pulse includes data signals collected across a spectrum having wavelengths that range from 100 nm to 1500 nm, such as from 150 nm to 1450 nm, such as from 200 nm to 1400 nm, such as from 250 nm to 1350 nm, such as from 300 nm to 1300 nm, such as from 350 nm to 1250 nm, such as from 400 nm to 1200 nm, such as from 450 nm to 1150 nm, such as from 500 nm to 1100 nm, such as from 550 nm to 1050 nm and including passing light having wavelengths that range from 600 nm to 1000 nm. In some embodiments, the photodetector signal pulse generated includes data signals collected across a spectrum having wavelengths that range from 360 nm to 960 nm.

In some embodiments, each photodetector signal pulse has a unique shape or pattern. In certain embodiments, each photodetector signal pulse has an identifiable shape or pattern, such as where the photodetector signal pulse can be used to identify the components of the particle (e.g., fluorophores) or one or more parameters of the particle (e.g., particle shape, size). In certain embodiments, methods include characterizing the fluorophore abundance of the particle based on the photodetector signal pulse. In other embodiments, the methods include identifying the types of fluorophores on the particle based on the photodetector signal pulse. In other embodiments, methods include characterizing the size of the particle based on the photodetector signal pulse. In other embodiments, methods include characterizing the center of mass of the particle based on the photodetector signal pulse. In other embodiments, methods include characterizing the orientation of the particle based on the photodetector signal pulse. In other embodiments, methods include characterizing the eccentricity of the particle based on the photodetector signal pulse. In other embodiments, methods include determining if the co-localization coefficient (i.e., the degree of co-localization) of the particle based on the photodetector signal pulse. In some embodiments, methods include identifying the particle based on the photodetector signal pulse. In some embodiments, methods include generating a sort decision for the particle based on the photodetector signal pulse.

In certain embodiments, methods also include sorting the particle. The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, methods may include sorting 2 or more components of a sample, such as 3 or more components, such as 4 or more components, such as 5 or more components, such as 10 or more components, such as 15 or more components and including sorting 25 or more components of the sample. In embodiments, methods including sorting cells based on the photodetector signal pulse.

A particular subpopulation of interest may then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two-dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In some embodiments, methods include sorting components of a sample, such as described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosures of which are herein incorporated by reference in their entirety. In some embodiments, methods for sorting components of sample include sorting particles (e.g., cells in a biological sample) with an enclosed particle sorting module, such as those described in U.S. Patent Publication No. 2017/0299493, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having: algorithm for irradiating a particle propagating along a flow stream through an interrogation region, algorithm for detecting light from the particle propagating along the flow stream through the interrogation region with a light detection system having a wavelength separator component configured to pass light having a predetermined spectral range across the wavelength separator, a light adjustment component configured to continuously convey light from the irradiated particle across the wavelength separator as the particle is propagated along the flow stream and a photodetector configured to detect light conveyed across the wavelength separator and algorithm for generating a photodetector signal pulse in response to light detected from the wavelength separator.

In some embodiments, the non-transitory computer readable storage medium includes instructions having an algorithm for identifying the particle based on the photodetector signal pulse. In some embodiments, the non-transitory computer readable storage medium includes instructions having an algorithm for characterizing the size of the particle based on the photodetector signal pulse. In other embodiments, the non-transitory computer readable storage medium includes instructions having an algorithm for characterizing the center of mass of the particle based on the photodetector signal pulse. In other embodiments, the non-transitory computer readable storage medium includes instructions having an algorithm for characterizing the orientation of the particle based on the photodetector signal pulse. In other embodiments, the non-transitory computer readable storage medium includes instructions having an algorithm for characterizing the eccentricity of the particle based on the photodetector signal pulse. In other embodiments, the non-transitory computer readable storage medium includes instructions having an algorithm for determining if the co-localization coefficient (i.e., the degree of co-localization) of the particle based on the photodetector signal pulse. In certain embodiments, the non-transitory computer readable storage medium includes instructions having an algorithm for generating a sort decision for the particle based on the photodetector signal pulse.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Kits including one or more components of the subject systems are also provided. Kits according to certain embodiments include a double telecentric lens, a wavelength separator component configured to pass light having a predetermined spectral range across the wavelength separator and a photodetector (e.g., a photomultiplier tube). In some embodiments, the wavelength separator includes a linear variable optical filter. In some instances, the wavelength separator includes a short pass linear variable bandpass filter. In some instances, the wavelength separator includes a long pass linear variable bandpass filter. In certain instances, kits include a short pass linear variable bandpass filter and a long pass linear variable bandpass filter. In other instances, the wavelength separator includes a short pass linear variable edge filter. In some instances, the wavelength separator includes a long pass linear variable edge filter. In certain instances, kits include a short pass linear variable edge filter and a long pass linear variable edge filter. Kits may also include a flow cell nozzle as well as a cuvette for irradiating the flow stream. Kits may also include an optical adjustment component, such as lenses (e.g., a focusing lens, objective lens), mirrors, filters, fiber optics, wavelength separators, pinholes, slits, collimating protocols and combinations thereof. In certain instances, kits include one or more light sources, such as a laser, an LED, a broadband light source or a combination thereof.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

UTILITY

The subject methods, systems and computer systems find use in a variety of applications where it is desirable to optimize particle identification, characterization and sorting. The subject methods and systems provide for detecting light using spectral discrimination and for identifying or characterizing a particle in a flow stream. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A particle analyzer comprising:
   a light source configured to irradiate a particle propagating along a flow stream through an interrogation region;
   a light detection system comprising:
      a wavelength separator component configured to pass different wavelengths of light at different positions across the wavelength separator;
      a light adjustment component configured to continuously convey light from the irradiated particle to the different positions across the wavelength separator as the particle is propagated along the flow stream through the interrogation region; and
      a photodetector configured to detect light conveyed across the wavelength separator; and
   a processor comprising memory operably coupled to the processor wherein the memory comprises instructions stored thereon, which when executed by the processor, cause the processor to generate photodetector signal pulse in response to light detected from the wavelength separator.

2. The particle analyzer according to claim 1, wherein the light adjustment component comprises a double telecentric lens.

3. The particle analyzer according to claim 1, wherein the wavelength separator component is configured to pass light having wavelengths that range across the wavelength separator from 360 nm to 960 nm.

4. The particle analyzer according to claim 1, wherein the wavelength separator component comprises one or more linear variable bandpass filters.

5. The particle analyzer according to claim 4, wherein the wavelength separator component comprises one or more of:
   a long pass linear variable bandpass filter; and
   a short pass linear variable bandpass filter.

6. The particle analyzer according to claim 1, wherein the wavelength separator component comprises one or more linear variable edge filters.

7. The particle analyzer according to claim 6, wherein the wavelength separator component comprises one or more of:
   a long pass linear variable edge filter; and
   a short pass linear variable edge filter.

8. The particle analyzer according to claim 1, wherein the light detected from the irradiated particle propagating along the flow stream is one or more of fluorescence and scattered light through the interrogation region.

9. The particle analyzer according to claim 1, wherein the memory comprises instructions stored thereon, which when executed by the processor, cause the processor to plot a wavelength spectrum of the detected light based on the photodetector signal pulse.

10. A method comprising:
    irradiating with a light source a particle propagating along a flow stream through an interrogation region;
    detecting light from the particle in the flow stream with a light detection system comprising:
       a wavelength separator component configured to pass different wavelengths of light at different positions across the wavelength separator;
       a light adjustment component configured to continuously convey light from the irradiated particle to the different positions across the wavelength separator as the particle is propagated along the flow stream through the interrogation region; and a photodetector configured to detect light conveyed across the wavelength separator; and generating a photodetector signal pulse in response to light detected from the wavelength separator.

11. The method according to claim 10, wherein the light adjustment component comprises a double telecentric lens.

12. The method according to claim 10, wherein the method comprises continuously irradiating the particle propagating along the flow stream across an interrogation region of 1 mm or more.

13. The method according to claim 10, wherein the wavelength separator component is configured to pass light having wavelengths that range across the wavelength separator from 360 nm to 960 nm.

14. The method according to claim 10, wherein the wavelength separator component comprises one or more linear variable bandpass filters.

15. The method according to claim 14, wherein the wavelength separator component comprises one or more of:
a long pass linear variable bandpass filter;
a short pass linear variable bandpass filter.

16. The method according to claim 10, wherein the wavelength separator component comprises one or more linear variable edge filters.

17. The method according to claim 16, wherein the wavelength separator component comprises one or more of:
a long pass linear variable edge filter;
a short pass linear variable edge filter.

18. The method according to claim 10, wherein the method comprises detecting one or more of fluorescent light and scattered light from the irradiated particle propagating along the flow stream through the interrogation region.

19. The method according to claim 10, wherein the method further comprises plotting a wavelength spectrum of the detected light based on the photodetector signal pulse.

20. A kit comprising:
a flow cell configured for propagating a particle in a flow stream for irradiating through an interrogation region; and
a light detection system comprising:
a wavelength separator configured to pass different wavelengths of light at different positions across the wavelength separator;
a double telecentric lens configured to continuously convey light from the particle to the different positions across the wavelength separator; and
a photodetector configured to detect light conveyed across the wavelength separator.

* * * * *